(12) United States Patent
Glinec et al.

(10) Patent No.: US 12,251,278 B2
(45) Date of Patent: Mar. 18, 2025

(54) DENTAL SHADE MATCHING FOR MULTIPLE ANATOMICAL REGIONS

(71) Applicant: Dental Imaging Technologies Corporation, Quakertown, PA (US)

(72) Inventors: Yannick Glinec, Serris (FR); Victor C. Wong, Rochester, NY (US)

(73) Assignee: DENTAL IMAGING TECHNOLOGIES CORPORATION, Quakertown, PA (US)

(*) Notice: Subject to any disclaimer, the term of this patent is extended or adjusted under 35 U.S.C. 154(b) by 579 days.

(21) Appl. No.: 17/431,747

(22) PCT Filed: Mar. 10, 2020

(86) PCT No.: PCT/US2020/021804
§ 371 (c)(1),
(2) Date: Aug. 18, 2021

(87) PCT Pub. No.: WO2020/185733
PCT Pub. Date: Sep. 17, 2020

(65) Prior Publication Data
US 2022/0110729 A1    Apr. 14, 2022

Related U.S. Application Data

(60) Provisional application No. 62/816,199, filed on Mar. 10, 2019.

(51) Int. Cl.
*A61C 13/08* (2006.01)
*A61C 9/00* (2006.01)
(Continued)

(52) U.S. Cl.
CPC .......... *A61C 13/082* (2013.01); *A61C 9/0053* (2013.01); *G01J 3/508* (2013.01);
(Continued)

(58) Field of Classification Search
CPC ..... A61C 13/082; A61C 9/00053; G06T 7/90; G06T 2207/10024; G06T 2207/10028; G06T 2207/30036; G01J 3/508
See application file for complete search history.

(56) References Cited

U.S. PATENT DOCUMENTS 8,790,118 B2   7/2014  Lehmann et al.
9,295,532 B2   3/2016  Milch
(Continued)

FOREIGN PATENT DOCUMENTS

JP      2010-502300 A      1/2010

OTHER PUBLICATIONS

Brian Curless et al., "A Volumetric Method for Building Complex Models from Range Images," Proceedings of SIGGRAPH96, 303-312 (1996).

(Continued)

*Primary Examiner* — Nicholas D Lucchesi
(74) *Attorney, Agent, or Firm* — ALSTON & BIRD LLP

(57) ABSTRACT

A shade matching method for a tooth obtains a plurality of digitized tooth shade references, obtains a three-dimensional (3D) surface representation of a tooth and associated color information defined on the three-dimensional (3D) surface, selects a region on the three-dimensional (3D) surface representation of the tooth, determines a plurality of correspondences with the common tooth shape of all the tooth shade references, computes color difference with each of the tooth shade reference from the plurality of tooth shade references, and records the label corresponding to the shade reference with a smallest difference.

22 Claims, 22 Drawing Sheets

(51) Int. Cl.
*G01J 3/50* (2006.01)
*G06T 7/90* (2017.01)

(52) U.S. Cl.
CPC ...... *G06T 7/90* (2017.01); *G06T 2207/10024* (2013.01); *G06T 2207/10028* (2013.01); *G06T 2207/30036* (2013.01)

(56) References Cited

U.S. PATENT DOCUMENTS

| | | | |
|---|---|---|---|
| 9,349,182 B2 | 5/2016 | Milch | |
| 10,007,987 B1 | 6/2018 | Braunston | |
| 2001/0038705 A1* | 11/2001 | Rubbert | B33Y 50/00 382/128 |
| 2004/0252303 A1 | 12/2004 | Giorgianni et al. | |
| 2011/0213253 A1* | 9/2011 | Kruglick | A61B 5/444 382/128 |
| 2012/0100508 A1 | 4/2012 | Lehmann et al. | |
| 2013/0244197 A1 | 9/2013 | Tjioe et al. | |
| 2017/0165038 A1 | 6/2017 | Esbech et al. | |
| 2018/0153664 A1 | 6/2018 | Esbech et al. | |

OTHER PUBLICATIONS

International Preliminary Report on Patentability received for PCT Patent Application No. PCT/US2020/021804, mailed on Sep. 23, 2021, 8 pages.
International Search Report and Written Opinion received for PCT Patent Application No. PCT/US2020/021804, mailed on Jun. 18, 2020, 10 pages.
Michael Kazhdan et al., "Screened Poisson Surface Reconstruction," ACM Transactions on Graphics, 32(3):1-13, (2013).
Radu Rusu, "Semantic 3D Object Maps for Everyday Manipulation in Human Living Environments," Dissertation, 284 pages, (Aug. 17, 2009).
Rosana Montes et al., "An Overview of BRDF Models," Technical Report LSI-2012-001, 1-26 (2012).
JP Office Action Mailed on Jan. 16, 2024 for JP Application No. 2021-554602, 5 page(s).
English Translation of JP Office Action dated Jan. 16, 2024 for JP Application No. 2021-554602, 4 page(s).

* cited by examiner

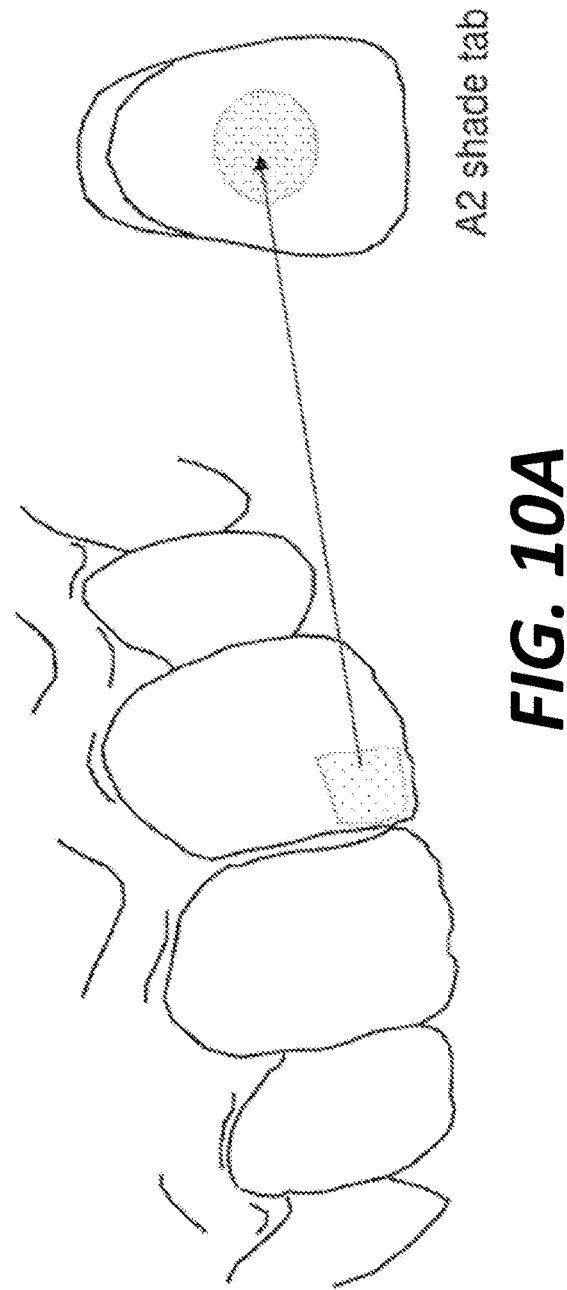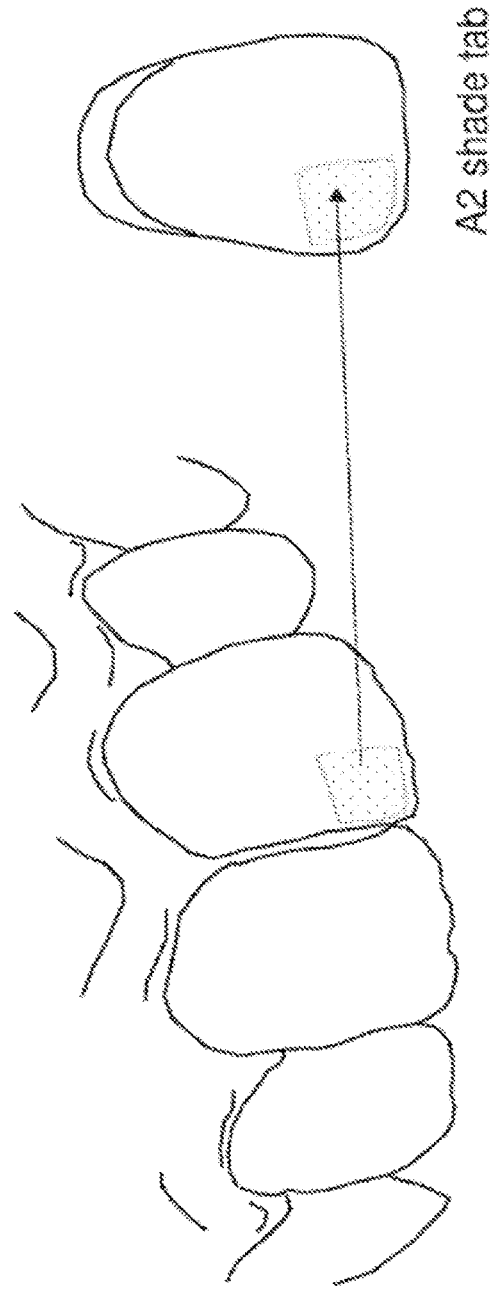

DENTAL SHADE MATCHING FOR MULTIPLE ANATOMICAL REGIONS

TECHNICAL FIELD

The disclosure relates generally to methods and apparatuses in three-dimensional (3D) dental intraoral scanning and, more particularly, relates to shade matching methods and apparatuses for multiple anatomical regions in three-dimensional (3D) dental intraoral scanning.

BACKGROUND

Accurately modeling the color shade of teeth is particularly valued for patient appearance and satisfaction in restorative dentistry. In conventional practice, the dental technician or practitioner manually estimates the color and overall appearance of the tooth using sets of shade tabs. Shade tabs for dental color are often provided by suppliers of restorative materials and show the available color tints or color range that are available for the filling, crown, implant, bridge, or other restorative feature. Even with the aid of a well-stocked set of dental shade tabs, however, color shade decisions can be difficult to make and subject to human error. The overall accuracy of a dental shade decision often depends on the relative experience and aesthetic taste of the practitioner.

In recent years, digital forms of shade tabs used for shade value matching have been created. The digital forms of shade tabs have been used with digital models of patients' teeth in various approaches that automate the process of determining tooth shades. Also, spectrophotometers have become available to acquire dental shade value measurements, including the SpectroShade Micro II and VITA Easyshade spectrophotometers. With some devices, such as the SpectroShade Micro II spectrophotometer, shade information is taken and analyzed based on two-dimensional (2D) images. With other devices, such as the VITA Easyshade spectrophotometer, shade information is taken in a region defined by the position of the device on the tooth.

Other devices such as three-dimensional (3D) dental scanners have become available with the capability of measuring dental shade. When these devices are used, a comparison step is executed by computer software between a region on patient's tooth surface at which the device is aimed and digitized shade information. The digitized shade information may be taken from shade tabs such as a VITA shade guide. Shade tabs usually have a color profile which changes over the tooth surface in order to represent the natural gradient of color between dentin and enamel regions. Normally, one shade value may be represented by a specific region of the shade tab such as the central region which represents the color of the dentin. By way of example, for a Vita Classical shade tab, a desired position was usually located around the "X" mark 115 as shown in the example of FIG. 9 which shows a shade tab with regions of different shade values. Around the "X" mark 115 in FIG. 9, shade values are correctly identified as A2 for this A2 shade tab. However, further away from this "X" mark, the shade may be detected as D2 because the enamel contains less colored pigments and thus looks more similar to the "X" mark on shade tab D2. In this example, because one shade value is only represented by a specific region of the shade tab and because shade tabs are not uniform, the shade values for different regions will not be identical. This is a source of confusion for the technician who has to look at the shade appearance around the "X" mark for the D2 shade tab and apply it onto the enamel which is a different location. Thus, apparatuses and methods are needed which detect, for example, that for this A2 shade tab, all the different regions are detected as A2. This would give clear instructions to the technician that "you simply need to reproduce the color gradient of an A2 shade tab".

FIG. 14 is a schematic diagram that shows shade distribution on one shade tab with shade variation from the dentin towards the enamel. Since mesial/distal/central part of the middle part/cervical/gingival part usually have different appearances, experienced dentists may measure corresponding anatomical regions between a patient's tooth and a shade tab.

FIGS. 10A and 10B are schematic diagrams that represent various anatomical mappings between a region of patient's teeth and shade tabs. As illustrated in FIG. 10A, the mesial incisal region of a patient's tooth is compared to the central region of a digitized shade information from an A2 shade tab as explained above. FIG. 10B shows another correspondence between the tooth and the shade tab which compares equivalent anatomical regions, which is a more natural way of defining correspondences.

Therefore, there is a need in the industry for tooth shade matching methods and apparatuses which consider the correspondence, for a tooth's anatomical regions, between a digital three-dimensional representation of the tooth and a shade tab, and that solve this and other problems, difficulties, deficiencies, and shortcomings of present methods and apparatuses.

SUMMARY

The present invention comprises tooth shade matching methods and apparatuses that consider the correspondence, for a tooth's anatomical regions, between a digital three-dimensional representation of the tooth and a shade tab. According to one aspect of an example embodiment of the invention, a shade matching method for a tooth comprises the steps of: obtaining a plurality of digitized tooth shade references, wherein each tooth shade reference corresponds to a common tooth shape, has a label and includes color information defined over the tooth shape; obtaining a three-dimensional surface representation of a tooth and associated color information defined on the three-dimensional surface; selecting a region on the three-dimensional surface representation of the tooth; determining a plurality of correspondences with the common tooth shape of all the tooth shade references, wherein the plurality of correspondences connects points from the same anatomical region between the selected region on the three-dimensional surface representation of the tooth and the common tooth shape; computing color difference with each of the tooth shade reference from the plurality of tooth shade references, wherein each color difference is computed by comparing color information from the tooth shade reference with the associated color information from the selected region on the three-dimensional surface representation of the tooth, wherein the comparison of color information uses the plurality of correspondences; and recording the label corresponding to the shade reference with a smallest difference.

According to another aspect of an example embodiment of the present invention, an intraoral imaging apparatus comprises: an image capture apparatus that obtains a plurality of digitized tooth shade references, wherein each tooth shade reference corresponds to a common tooth shape, has a label and includes color information on the tooth shape; another image capture apparatus that obtains a three-dimensional surface representation of a tooth and associated color information defined on the three-dimensional surface; a processor that is programmed with processing logic instructions to: select a region on the three-dimensional surface representation of the tooth; determine a plurality of correspondences with the common tooth shape of all the tooth shade references, wherein the plurality of correspondences connects points from the same anatomical region between the selected region on the three-dimensional surface representation of the tooth and the common tooth shape; compute color difference with each of the tooth shade reference from the plurality of tooth shade references, wherein each color difference is computed by comparing color information from the tooth shade reference with the associated color information from the selected region on the three-dimensional surface representation of the tooth, wherein the comparison of color information uses the plurality of correspondences; and record the label corresponding to the shade reference with a smallest difference.

According to still another aspect of an example embodiment of the present invention, an intraoral imaging apparatus comprises: an image capture device that obtains a plurality of digitized tooth shade references, wherein each tooth shade reference corresponds to a common tooth shape, has a label and includes color information on the tooth shape, and wherein the image capture device obtains a three-dimensional surface representation of a tooth and associated color information defined on the three-dimensional surface; a processor that is programmed with processing logic instructions to: select a region on the three-dimensional surface representation of the tooth; determine a plurality of correspondences with the common tooth shape of all the tooth shade references, wherein the plurality of correspondences connects points from the same anatomical region between the selected region on the three-dimensional surface representation of the tooth and the common tooth shape; compute color difference with each of the tooth shade reference from the plurality of tooth shade references, wherein each color difference is computed by comparing color information from the tooth shade reference with the associated color information from the selected region on the three-dimensional surface representation of the tooth, wherein the comparison of color information uses the plurality of correspondences; and record the label corresponding to the shade reference with a smallest difference.

BRIEF DESCRIPTION OF THE DRAWINGS

FIGS. 10A and 10B are schematic diagram showing corresponding anatomical regions between patient's teeth and shade tabs in various strategies.

DETAILED DESCRIPTION OF EXAMPLE EMBODIMENTS

Figure 1:
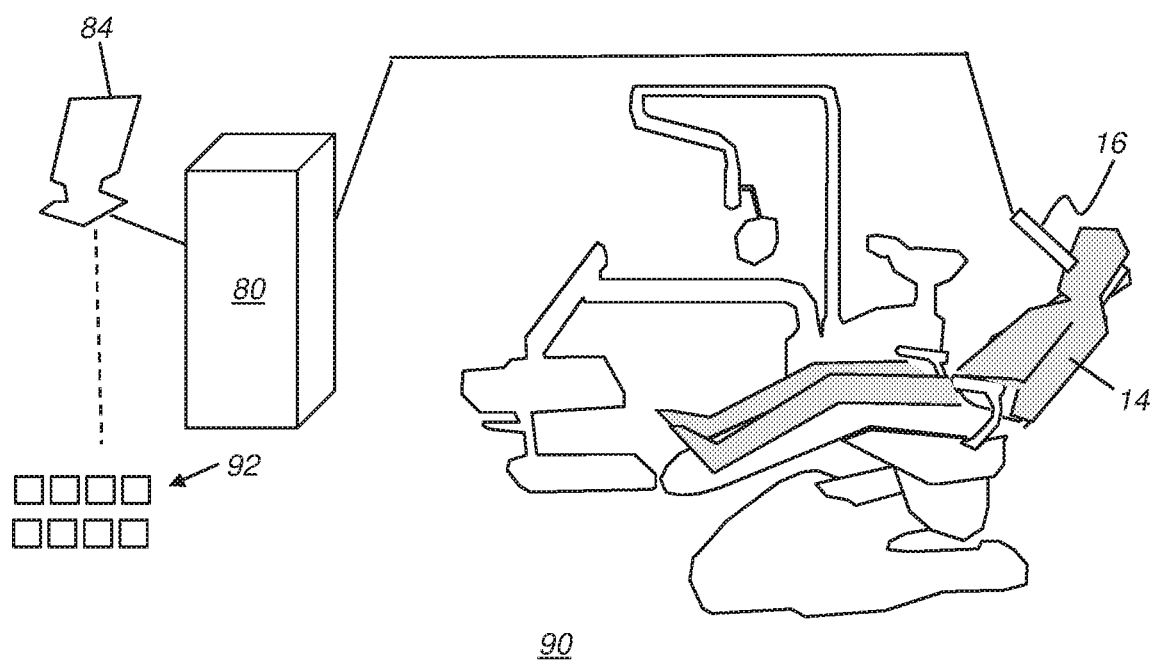
FIG. 1 is a schematic diagram showing an imaging apparatus for shade matching according to an example embodiment of the present invention.

In the following detailed description of example embodiments of the present invention, reference is made to the drawings in which like reference numerals identify like elements or steps throughout the several views. Where used in the context of the present disclosure, the terms "first", "second", and so on, do not necessarily denote any ordinal, sequential, or priority relation, but are simply used to more clearly distinguish one step, element, or set of elements from another, unless specified otherwise.

In the context of the present disclosure, the term "energizable" relates to a device or set of components that perform an indicated function upon receiving power and, optionally, upon receiving an enabling signal.

In the context of the present disclosure, the terms "viewer", "operator", and "user" are considered to be equivalent and refer to the viewing practitioner, technician, or other person who views and manipulates an image, such as a dental image, on a display monitor. An "operator instruction" or "viewer instruction" is obtained from explicit commands entered by the viewer, such as by clicking a button on a camera or by using a computer mouse or by touch screen or keyboard entry.

In the context of the present disclosure, the phrase "in signal communication" indicates that two or more devices and/or components are capable of communicating with each other via signals that travel over some type of signal path. Signal communication may be wired or wireless. The signals may be communication, power, data, control, or energy signals. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

In the context of the present disclosure, the term "set" refers to a non-empty set, as the concept of a collection of elements or members of a set is widely understood in elementary mathematics. The terms "subset" or "partial subset", unless otherwise explicitly stated, are used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, "surface data" can include surface contour characterization in the form of a point cloud, a polygonal mesh, or other surface representation or image. Surface data can include views of surface contour such as a dynamically growing surface contour actively assembled by the imaging system during data acquisition and can include reduced-resolution imaging that represents surface contour. Surface data can alternately be generated as part of a refinement step, the result of additional data acquisition or computation. High resolution surface data is typically needed by a technician for accurate design of a restorative appliance. According to an example embodiment of the present invention, surface data can include two-dimensional (2D) surface information derived from acquired three-dimensional (3D) scan data.

Intraoral Scanner

FIG. 1 is a schematic diagram showing an imaging apparatus 90 for three-dimensional (3D) scanning according to an example embodiment of the present invention. A camera 16, typically a hand-held digital camera, a color depth camera, handheld three-dimensional scanner, or intraoral three-dimensional scanner, is scanned through the mouth of a patient 14 for acquiring a set of image data comprising reflectance images and associated depth information. A control logic processor 80, in signal communication with camera 16, obtains image data from camera 16, processes the reflectance images to assign colors to the associated depth information, and computes the placement of the associated depth information with colors onto the growing surface contour. If placement can be successfully computed, control logic processor 80 generates an updated growing surface contour and shade labels 92. Control logic processor 80 combines the growing surface, typically provided as a point cloud, and renders the surface and the resulting shade labels on a display 84 that is in signal communication with processor 80.

Surface Data and Color Assignment

With reference to the imaging apparatus 90 of FIG. 1, camera 16 acquires a set of image data comprising reflectance images and associated depth information. Control logic processor 80 processes image data to provide a surface contour with local shade indication.

In an example embodiment, the reflectance images may be combined to form a color image, wherein the number of color channels is three or more. A color vector of dimension matching the number of color channels can be used to store the color values in the combined color image. In an example embodiment, the sensor is monochrome and requires multiple exposures with illumination at different central wavelengths. In another example embodiment, the color values are stored in an RGB color vector. Other equivalent three-dimensional (3D) color spaces can alternately be used. For instance, for color distance, it can be advantageous to use CIELAB three-dimensional (3D) color space, which has been designed to provide a perceptually uniform color distance, according to the sensitivity of the eye. In another example embodiment, if a spectrum of color channels having four or more central wavelengths is acquired, the corresponding color values are stored in color vectors.

In an example embodiment, the associated depth information is also obtained by processing reflectance images using a structured illumination as described in commonly assigned U.S. Pat. No. 9,295,532 B2 entitled "3D Intraoral Measurements Using Optical Multiline Method" and U.S. Pat. No. 9,349,182 B2 entitled "3D Intraoral Measurements Using Optical Multiline Method", both issued to Milch and both of which are hereby incorporated herein in their entirety by this reference. In another example embodiment, the associated depth information can be obtained using a technique including, but not limited to, any of the following: triangulation using projected patterns, depth from focus using a confocal geometry, or active or passive stereophotogrammetry.

In practice, reflectance images and associated depth information are acquired as quickly as possible in order to minimize scanner displacement during the sequence of camera exposures as image data is generated. Following this procedure, the associated depth information can be related to a pixel location from the reflectance image, also termed a range image, and colors can be assigned to the range image. Pixel data from a range image can be converted to three-dimensional point coordinates.

Shade Matching Method (Prior Art)

Figure 21:
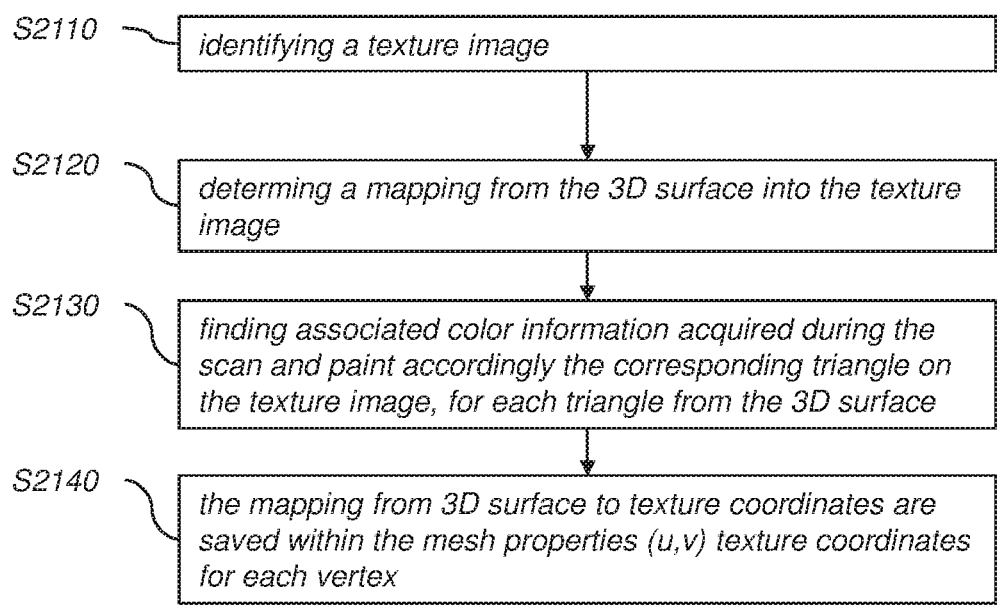
FIG. 21 is a flowchart representation of a shade matching method.

Nowadays, shade information is commonly taken and analyzed based on two-dimensional (2D) texture images. FIG. 21 is a flowchart representation of a shade matching method.

In Step S2110, a texture image is identified.

In Step S2120, a mapping from the three-dimensional (3D) surface onto the texture image is determined.

In Step S2130, for each triangle on the three-dimensional (3D) surface, find associated color information acquired during the scan and paint accordingly the corresponding triangle on the texture image.

In Step S2140, the mapping from three-dimensional (3D) surface to texture coordinates are saved within the mesh properties (u,v) texture coordinates for each vertex.

Figure 11:
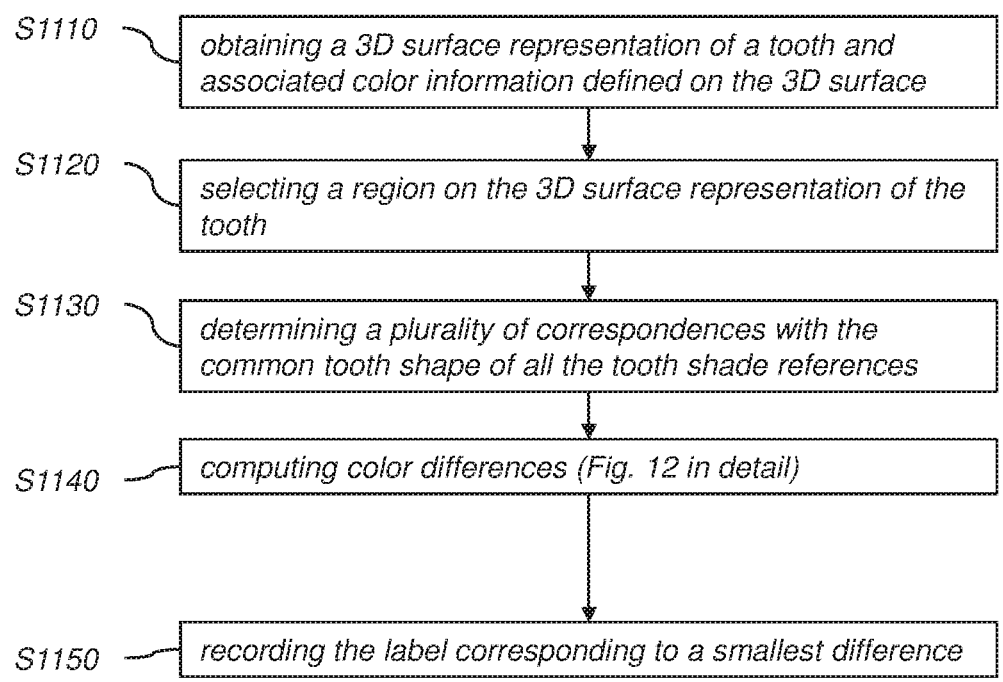
FIG. 11 is a flowchart representation of a shade matching method according to an example embodiment of the present invention.

Since only the correspondences between vertices of three-dimensional (3D) surfaces and texture coordinates are stored, the texture image should be kept and accessible for visualizing the three-dimensional (3D) surfaces or shade information reading.

Shade Matching for Multiple Anatomical Regions FIG. 11 is a flowchart representation showing a shade matching method according to an embodiment of the present invention.

Step S1110

In Step S1110, a three-dimensional surface representation of a tooth and associated color information defined on the three-dimensional surface are obtained. This provides a three-dimensional (3D) surface and associated shade distribution over the surface. The shade distribution is spatially resolved over the surface. The resolution depends on the type of shade data used. According to one example embodiment of the present invention, the shade distribution is texture data, i.e. an image with a resolution of about 50 μm. Texture is a spatial distribution providing color values at any position of the tooth surface. According to another example embodiment of the present invention, the shade distribution is a BRDF cloud with a resolution between 0.5 mm and 1 mm.

If only for obtaining an individual three-dimensional (3D) surface representation of a tooth, many intraoral three-dimensional scanners on market can be used, such as the CS3600 model from Carestream Dental LLC. In this step, besides the three-dimensional (3D) surface representation, the associated color information defined on the three-dimensional (3D) surface needs to be obtained as well. The associated color information can be measured by the same intraoral scanner, during the same scan operation for capturing the three-dimensional (3D) geometric data of the surface. Certainly, the color information can be acquired or input separately and linked to a position of the reconstructed three-dimensional (3D) tooth surface. For example, using some spectrophotometers to obtain color information of a tooth surface, such as the SpectroShade Micro II and VITA Easyshade spectrophotometers, and then manually inputting those shade values or making them linked to individual positions of the three-dimensional (3D) surface. According to an example embodiment of the present invention, the linking process between dental shade value and three-dimensional (3D) surface can be done automatically as well, by mapping a two-dimensional (2D) image of a tooth surface linked with dental shade values to the corresponding three-dimensional (3D) surface.

Color information, which means the basic color from acquired by a scanner, can be expressed or recorded in different ways or formats. One of the typical ways is using color values acquired from two-dimensional (2D) images corresponding to three-dimensional (3D) surface locations, in a form of RGB, CIELAB XYZ (defined by the International Commission on Illumination), or a visible spectrum. According to an example embodiment of the present invention, obtaining a 3D surface representation of a tooth and associated color information defined on the three-dimensional (3D) surface is performed using an intraoral scanner. According to an example embodiment of the present invention, the associated color information defined on the three-dimensional (3D) surface includes red, green, and blue color data values. According to an embodiment of the present invention, the associated color information defined on the three-dimensional (3D) surface includes CIELAB color data values. According to an example embodiment of the present invention, the associated color information defined on the three-dimensional (3D) surface includes a spectrum with wavelengths covering the visible wavelengths.

Step S1120

Figure 16:
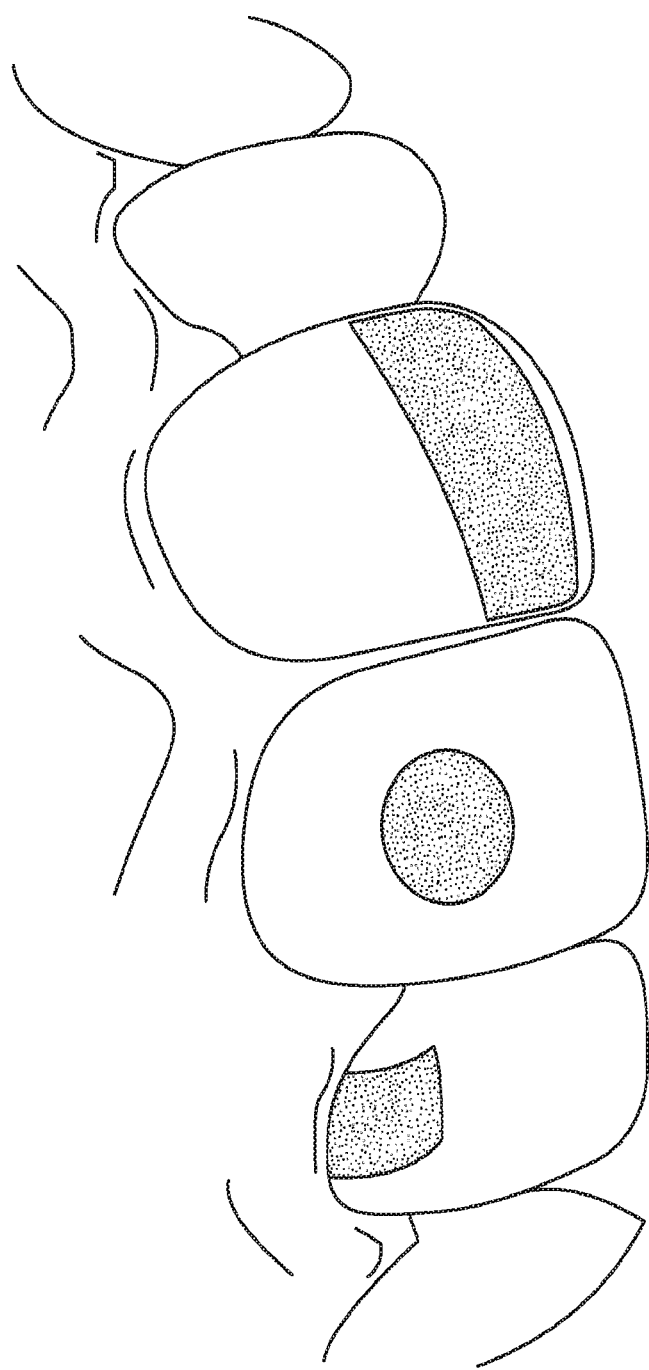
FIG. 16 is a schematic diagram showing various examples of three-dimensional region on a tooth.

In Step S1120, a region on the three-dimensional (3D) surface representation of the tooth is selected. This is a selection or segmentation task, which can be manual, semi-automatic or automatic. FIG. 16 is a schematic diagram that shows various examples of three-dimensional (3D) regions on a tooth.

For a manual process, the selection operated by a user can be a region defined by a polygon or a circle.

For a semi-automatic selection, a user selects multiple points on the three-dimensional (3D) tooth surface first, and then a computing algorithm will help adjust the initial polygon onto the contour of the tooth. This is primarily achieved by attracting the contour towards region of small radius of curvature. This optimization of the contour follows a strategy similar to the margin line detection used in dental application. According to an example embodiment of the present invention, the algorithm is a path tracing where user clicks are control points and which follows the path of minimum radius of curvature. A regularization may be applied to prevent the contour from distorting too much and maintain. Control points can be added or removed and the contour is updated accordingly. The surface within the closed contour becomes the selected region.

For an automatic selection, only minimal user interaction is needed, such as a single click to define the tooth of interest. Control points can then radially be placed automatically when the radius of curvature of the surface reaches a predefined threshold or when surface normal makes an angle beyond a predefined threshold with respect to the screen normal. Then, the path following algorithm can determined a closed contour, defining the selected region. According to an example embodiment of the present invention, the closed contour can be automatically cut into multiple three-dimensional (3D) regions, which create a partition of the surface contained in the closed contour. The multiple three-dimensional (3D) regions can be cervical third, middle third and enamel third. According to another example embodiment of the present invention, the multiple three-dimensional (3D) regions can be defined by a 3×3 grid on the tooth surface. Each three-dimensional (3D) region from the multiple three-dimensional (3D) regions is then processed.

According to an embodiment of the present invention, selecting a region on the three-dimensional (3D) surface representation of the tooth comprises a segmentation process, and the segmentation process can manual, semi-automatic or automatic.

Step S1130

Figure 15:
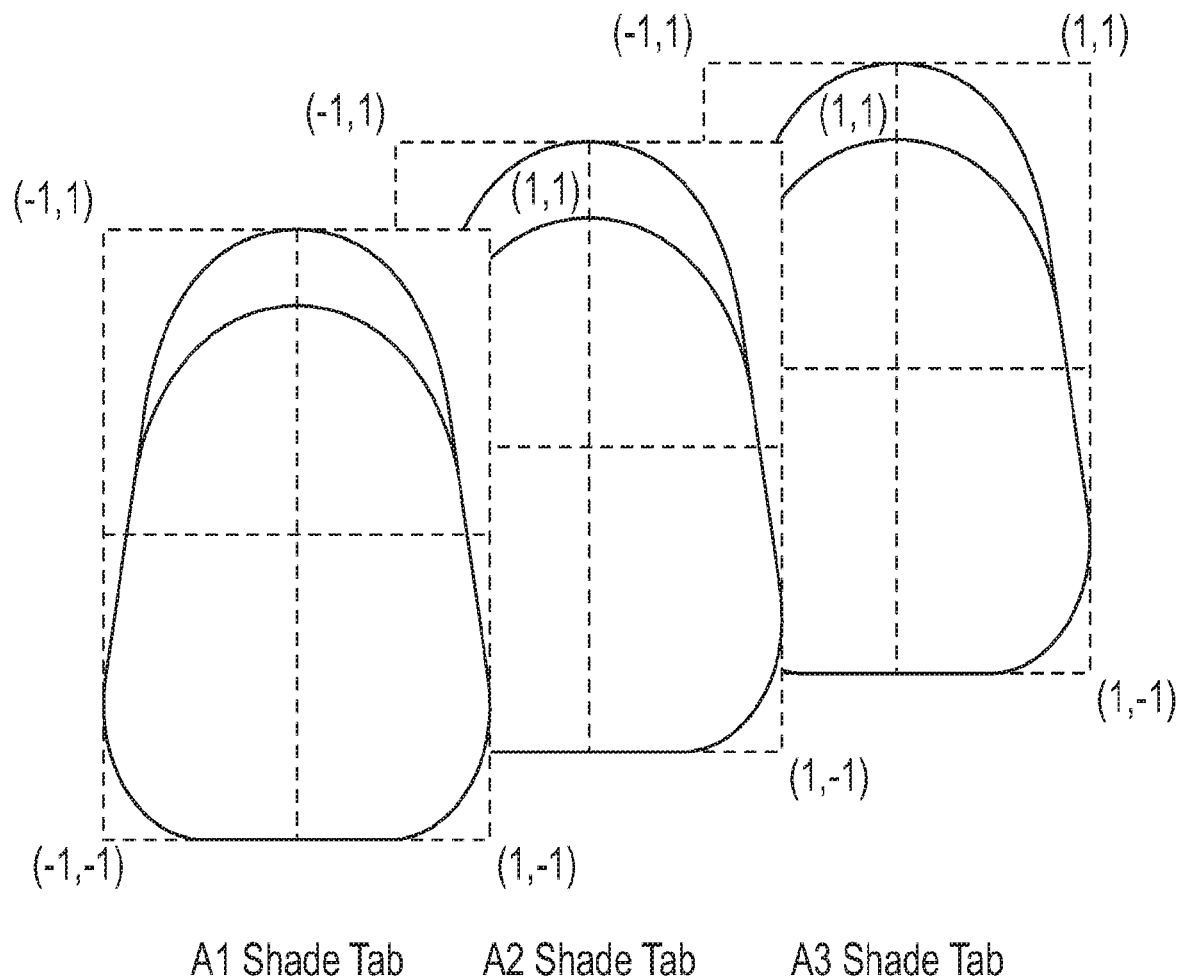
FIG. 15 is a schematic diagram showing all shade tabs from the shade guide have a common tooth shape, but with different shade distributions and can be expressed in the same coordinate system.

In Step S1130, a plurality of correspondences with a common tooth shape of all the tooth shade references are determined. The plurality of correspondences connects points from the same anatomical region between the selected region on the three-dimensional (3D) surface representation of the tooth and the common tooth shape. That is, each one of the correspondences is a mapping from the selected region on the three-dimensional (3D) surface representation of the tooth to the same anatomical region on the common tooth shape of the shade references. According to an example embodiment of the present invention, each one of the shade references is a shade tab from a shade guide, so all the tooth shade references should have a common tooth shape. FIG. 15 is a schematic diagram that shows all shade tabs from the shade guide have a common tooth shape, but with different shade distributions and can be expressed in the same coordinate system.

Usually, digitized tooth shade references can be obtained in advance, i.e. before the scan operation on a patient's tooth. Certainly, the digitized tooth shade references can also be carried after the scan operation on a patient's tooth. According to an example embodiment of the present invention, obtaining a plurality of digitized tooth shade references is operated before or after Step S1110 obtaining a three-dimensional (3D) surface representation of a tooth and associated color information defined on the three-dimensional surface.

Each tooth shade reference, i.e. each shade tab from the digitized shade guide, corresponds to a common tooth shape, has a label and contains color information defined over the tooth shape. Typically, all shade tabs have the same shape which is like a human's incisal tooth, for which the correct shade value is the most important because they are revealed when smiling. This common tooth shape helps the method to determine a plurality of corresponding anatomical regions between three-dimensional (3D) dental tooth and the common tooth shape of shade reference. The same anatomical regions can be described using common dental vocabulary such as gingival, cervical, central, incisal, mesial, distal, interproximal, coronal, enamel, dentin, pulp, translucent part, lingual, buccal, occlusal and so on.

Figure 17:
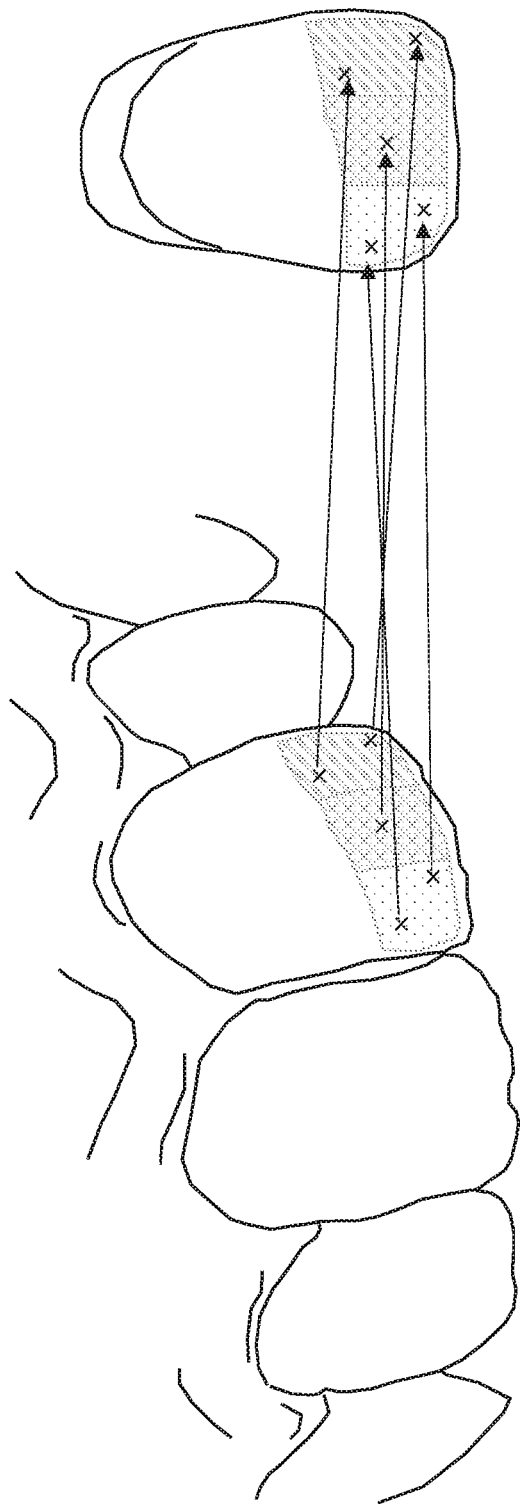
FIG. 17 is a schematic diagram showing anatomical mapping illustrated for a coarse spatial resolution of the shade distribution according to an example embodiment of the present invention.

FIG. 17 is a schematic diagram that shows anatomical mapping illustrated for a coarse spatial resolution of the shade distribution according to an example embodiment of the present invention. The density of correspondences is approximately equivalent to the number of areas of the coarse shade distribution covered by the three-dimensional (3D) region. A user can easily draw those correspondences. A coarse number of correspondences will range between 1 and 20 usually.

Figure 18:
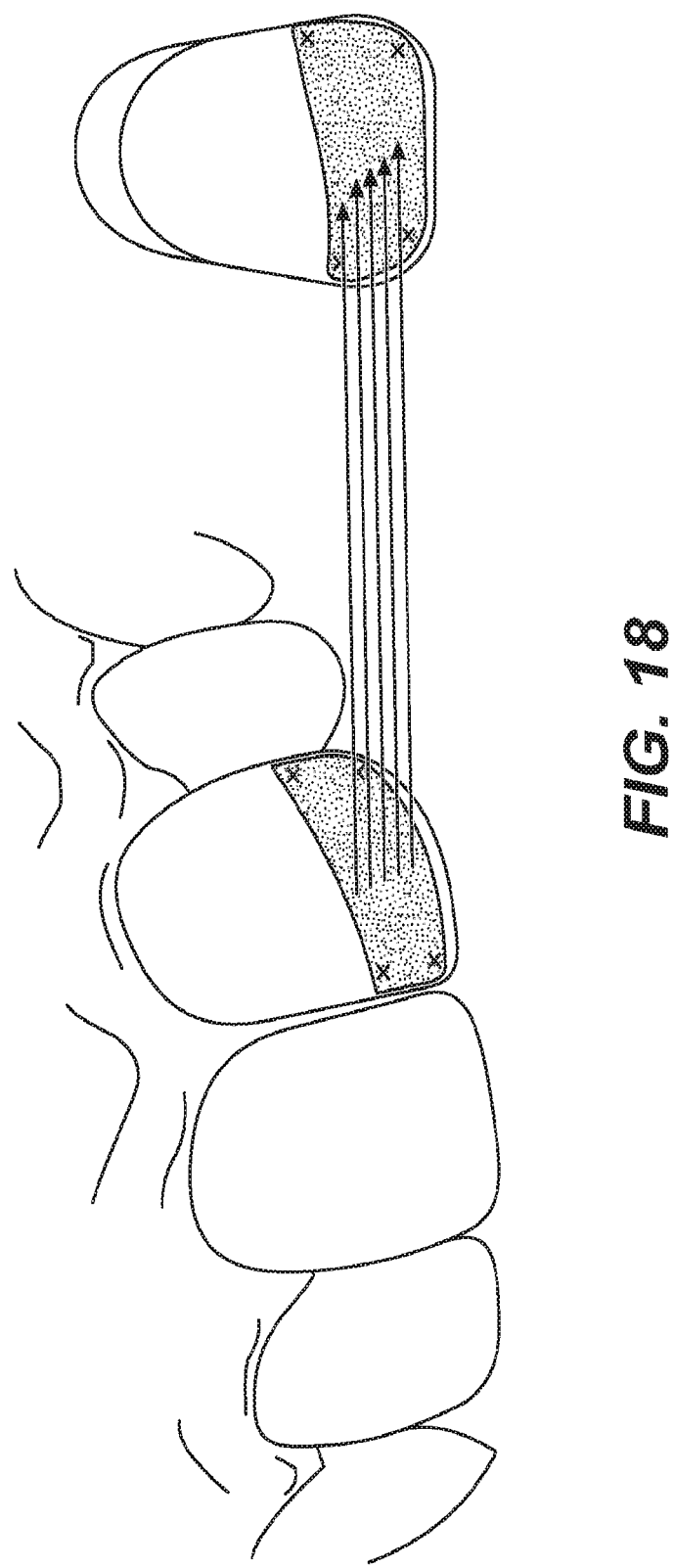
FIG. 18 is a schematic diagram showing anatomical mapping illustrated for a fine spatial resolution of the shade distribution according to an example embodiment of the present invention.

FIG. 18 is a schematic diagram that shows anatomical mapping illustrated for a fine spatial resolution of the shade distribution according to an embodiment of the present invention. The correspondences between pixels can be extrapolated from a coordinate system defined only by a few control points. Here, a user of the algorithm would place a few numbers of control points (as indicated by crosses) to define a similar coordinate system on each surface. Correspondences would then be sampled from those coordinate systems using interpolation between the control points. FIG. 18 only shows one series of correspondences for graphical purposes. Other correspondences are generated by moving this series sideways in order to cover the entire three-dimensional region defined by the control points. Dense correspondences require an automatic mapping and will usually correspond to sets with more than 20 correspondences. The number of correspondences can be as high as 10,000 or even higher.

Figure 19:
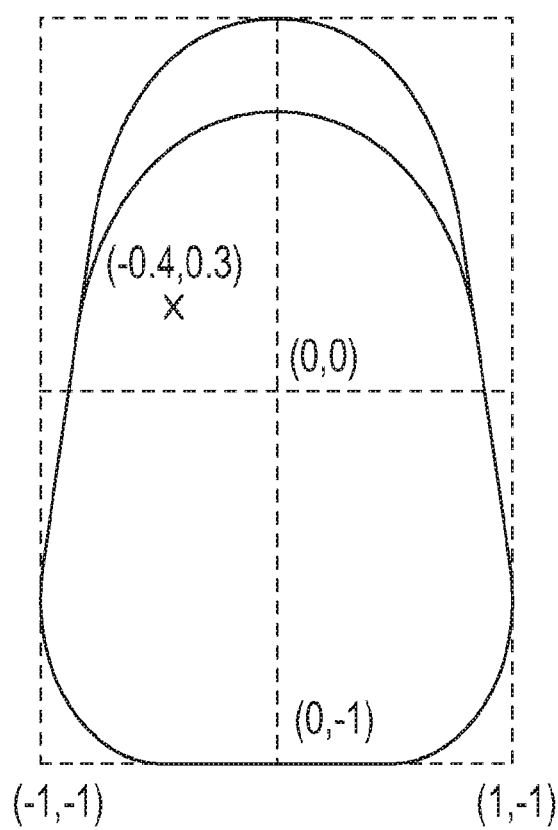
FIG. 19 is a schematic diagram showing an anatomical coordinate system defined for the tooth reference surface according to an example embodiment of the present invention.
Figure 20:
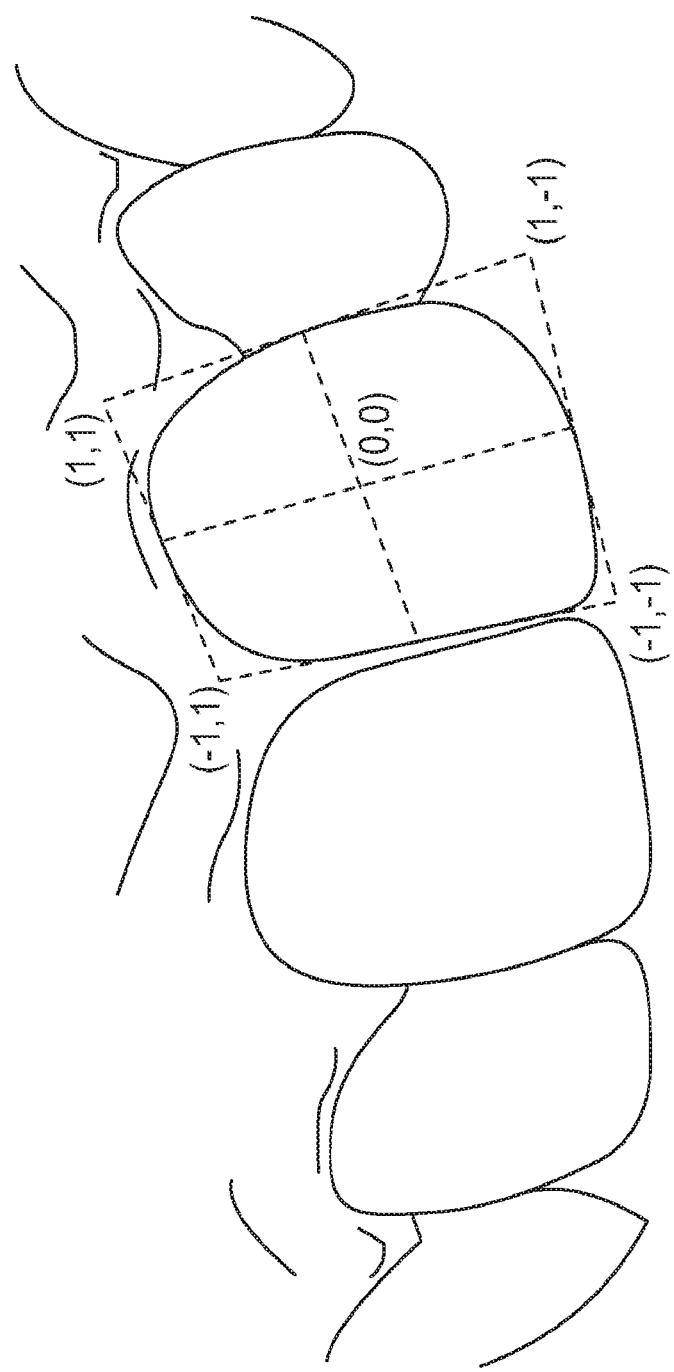
FIG. 20 is a schematic diagram showing an anatomical coordinate system mapped on a tooth from the tooth reference surface of FIG. 19 according to an example embodiment of the present invention.

The coordinate system can also be defined for the shade reference surface, and mapped onto a tooth surface. FIG. 19 is a schematic diagram that shows an exemplary anatomical coordinate system defined for the shade reference surface according to an example embodiment of the present invention. FIG. 20 is a schematic diagram that shows an exemplary anatomical coordinate system mapped on a tooth from the tooth reference surface shown in FIG. 19 according to an example embodiment of the present invention. The homography used in this example distorts the original rectangle from FIG. 19 into a polygon on FIG. 20. The homography is the mapping between the two coordinate systems. More generally, a mapping between coordinate systems is an injective function which takes a three-dimensional (3D) coordinate and provides the corresponding three-dimensional (3D) coordinate everywhere within the three-dimensional (3D) region. Sometimes, a three-dimensional (3D) point on the surface of the shade tab, may be mapped onto an empty space on the tooth surface, because the geometries are not exactly the same. In this case, those correspondences are not kept.

According to an example embodiment of the present invention, the BRDF library represents a collection of reference BRDF and their associated shade labels (details of the BRDF library will be introduced in other section). The BRDF library may be pre-recorded directly at fabrication and re-used during a scan of patient teeth. The BRDF library may also be generated by the practitioner, using preferred shade tabs. The BRDF Library is a collection of shade labels, and each shade label has its associated shade distribution, which is represented by spatially-resolved BRDF distributions. Distance between two BRDF distributions or explained more in detail in other sections of this document.

According to an example embodiment of the present invention, determining a plurality of correspondences is a manual process, an automatic process or a semi-automatic process. For the manual process, a user determines and selects the same anatomical region on the common tooth shape using a computer mouse or a touchscreen. For the automatic process, there are some optional steps, including: (a) the three-dimensional (3D) surface representation of the tooth is segmented from gums using colors and morphological operations; and/or (b) an injective transformation is used for mapping from the selected region on the three-dimensional (3D) surface representation of the tooth to the region on the common tooth shape. The transformation is determined by the three-dimensional (3D) surface representation of the tooth and the surface of shade reference, and usually a bijective spatial transform would be suitable, and interpolation can be used when necessary.

For the semi-automatic process, a user operates further adjustment of the region provided by the automatic process, and the adjustment includes making further modification to position, scale or orientation of the region provided by the automatic process. For example, scrolling of the computer mouse wheel may provide a scale adjustment, and combination of computer mouse click and movement may provide the change of orientation, position or rotation. According to an example embodiment of the present invention, the user would use the mouse to stretch the common surface to all shade tabs into the selected three-dimensional (3D) region either using some transparency or using overlay on the screen. The transparency or overlay are there to help the user estimate when the stretching has become satisfying. Or inversely, stretch the selected three-dimensional (3D) region from the three-dimensional (3D) tooth surface into the common surface to all shade tabs. Correspondences can then be generated using the injective transformation by sampling it. Some samples might not be on the tooth surface and are not recorded as correspondences. According to an example embodiment of the present invention, correspondences determined in this step are defined/stored inside the data of the selected three-dimensional (3D) region.

Step S1140

In Step S1140, computing color difference with each of the tooth shade reference from the plurality of tooth shade references, each color difference is computed by comparing color information from the tooth shade reference with the associated color information from the selected region on the three-dimensional (3D) surface representation of the tooth, wherein the plurality of correspondences got from Step S1130 is used in this comparison of color information.

Figure 12:
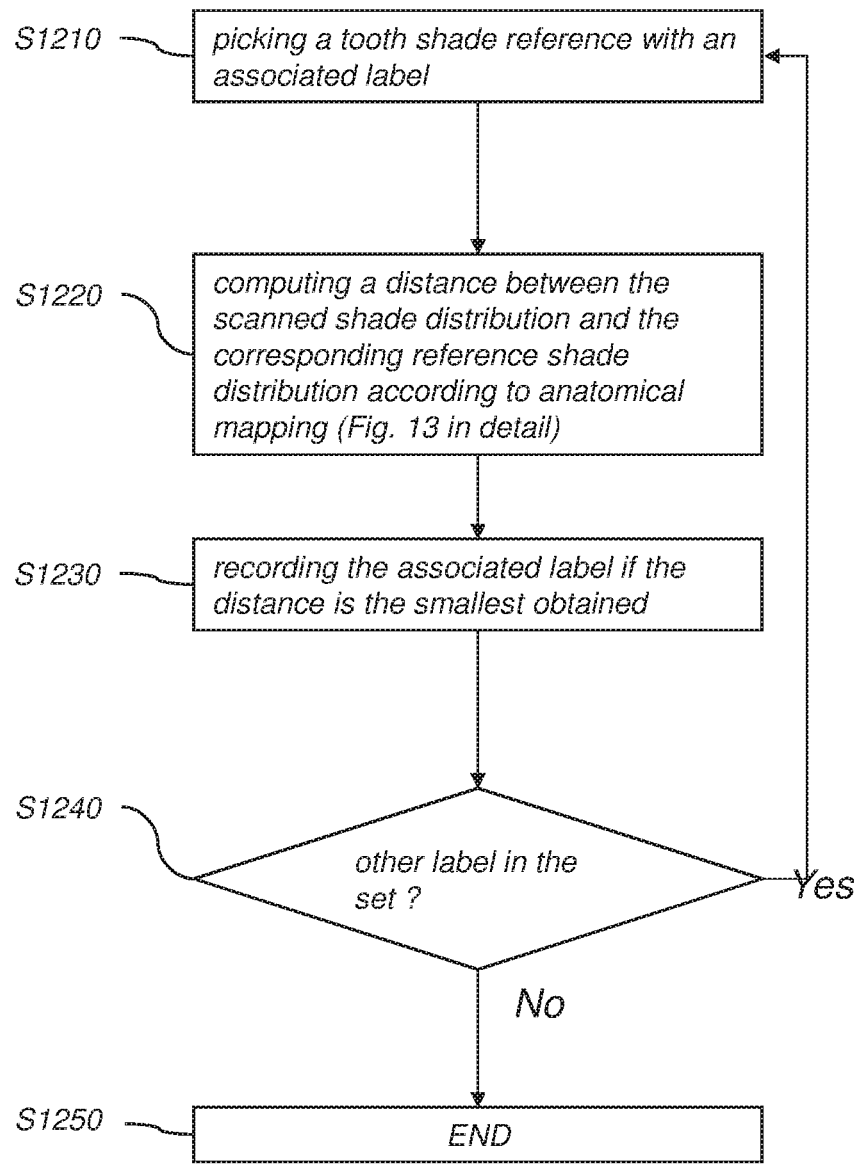
FIG. 12 is a flowchart representation of a method of computing shade distances for a plurality of reference shade distributions according to an example embodiment of the present invention.

More details of Step S1140 are described further referring to FIG. 12. FIG. 12 is a flowchart representation showing a process of computing shade distances for a plurality of reference shade distributions according to an example embodiment of the present invention.

In Step S1210, a tooth shade reference with an associated label is picked up. Over the reference tooth surface, a shade distribution is defined. The tooth shade reference is a digitized shade tab from the shade guide, and typically all the shade tabs within the shade guide have a common tooth shape, so the same reference tooth surface can be used without loss of generality. The label would typically be "A1", "B3" and the like for the Vita Classic set, or "2L1.5", "3M1" and the like for the Vita 3DMaster.

In Step S1220, a distance between the scanned shade distribution and the corresponding reference shade distribution according the anatomical mapping is computed. More details of Step S1220 are described further referring to FIG. 13.

Figure 13:
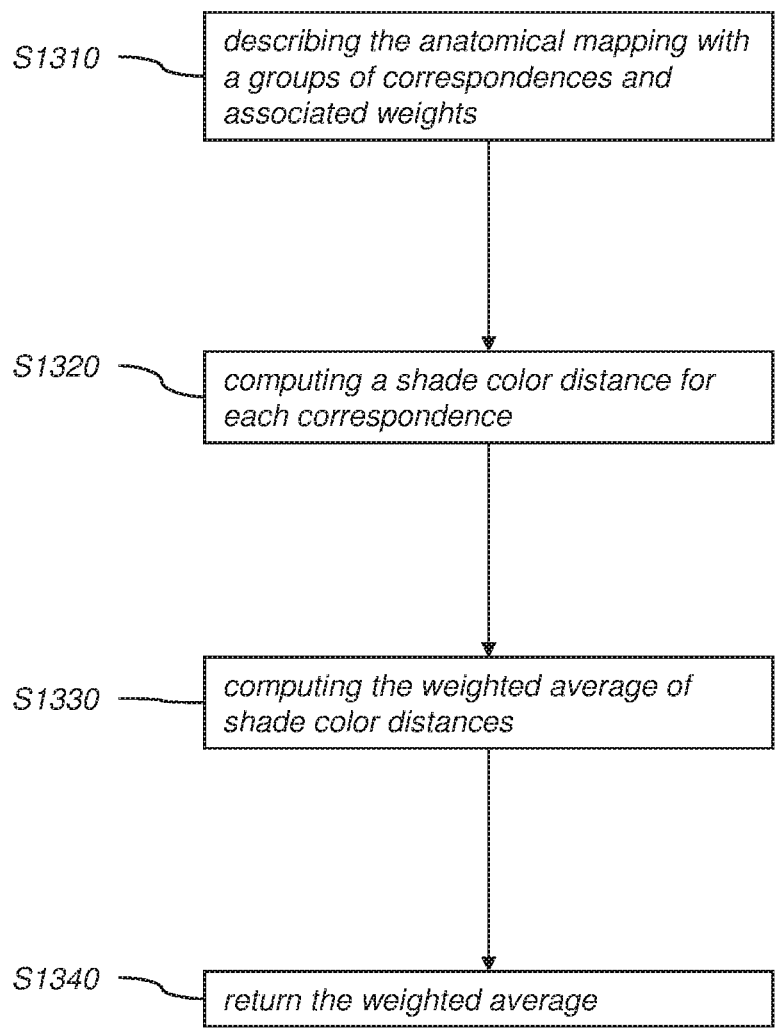
FIG. 13 is a flowchart representation of a method of computing a distance between the scanned shade distribution and the reference shade distribution using the anatomical mapping according to an example embodiment of the present invention.
Figure 14:
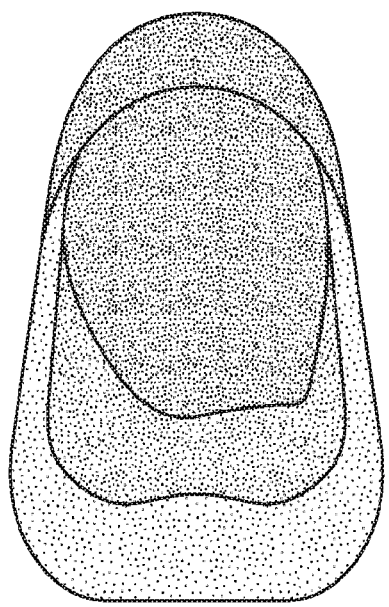
FIG. 14 is a schematic diagram showing shade distribution on one shade tab with shade variation from the dentin towards the enamel.

FIG. 13 is a flowchart representation showing a process of computing a distance between the scanned shade distribution and the reference shade distribution using the anatomical mapping according to an example embodiment of the present invention.

In Step S1310, the anatomical mapping with a group of correspondences and associated weights are described. The density of correspondences in the three-dimensional (3D) region should be comparable to the resolution of the shade distribution. For a texture, it will be typically the size of one pixel of the texture image. For a BRDF, it will be about the spatial resolution of the structure holding the various BRDFs defined over the surface. The weights may be uniform or may vary depending on the represented area on the anatomical mapping. The sum of weights is ideally normalized to 1 to simplify the average below.

In Step S1320, for each correspondence, a shade color distance is computed. The color difference is preferably expressed in CIELAB color space, which provides a distance which is adapted to the human perception of color variation. A correspondence defines two points at which the shade distributions are evaluated. The distance is defined as the norm of the difference between the sampled shade distributions from the three-dimensional (3D) tooth surface and tooth shade reference.

In Step S1330, the weighted average of shade color distances is computed. If weights were normalized, it's simply a weighted sum.

In Step S1340, the weighted average is returned. If CIELAB space was used, the returned distance is in DeltaE ($\Delta E$) unit, i.e. a visual perception of color difference.

Referring back to FIG. 12 and continuing after Step S1220, in Step S1230, the associated label is recorded if the distance is the smallest obtained.

In Step S1240, a judgement is made to decide whether there is other label remaining in the set. If "Yes", the method goes back to Step S1210; if "No", the method proceeds to Step 1250, the End, which means computation of color differences in Step 1140 is done.

Step S1150

In Step S1150, the label corresponding to the shade reference with a smallest difference is recorded. Until this step, the method mainly focuses on one selected region. It should be understood that this is only for the purpose of a brief and clear explanation. According to another example embodiment of the present invention, multiple regions could be selected and shade labels for different regions are decided accordingly. Furthermore, a grid can be defined on a buccal surface of the tooth. For example, a 3×3 grid or a 1×3 grid could be considered by a dentist. A denser grid may be used if needed. Thus, according to another example embodiment of the present invention, a shade matching method for a tooth comprising: (a) selecting a tooth and defining a grid on a buccal surface of the tooth; (b) defining a mapping of the grid from the buccal surface to a surface on a common tooth shape; (c) computing a shade label for each cell of the grid according to process introduced previously in this invention, each cell defining a selected three-dimensional region; and (d) storing shade labels for cells of the grid.

Motivation for Using an Angular Distribution of Color Vectors

Texture characterization falls short of accurate modeling of the true color shading of a tooth. This can readily be seen in side-by-side comparisons of different views of the same tooth or shade tab having slightly different illumination.

Figure 2:
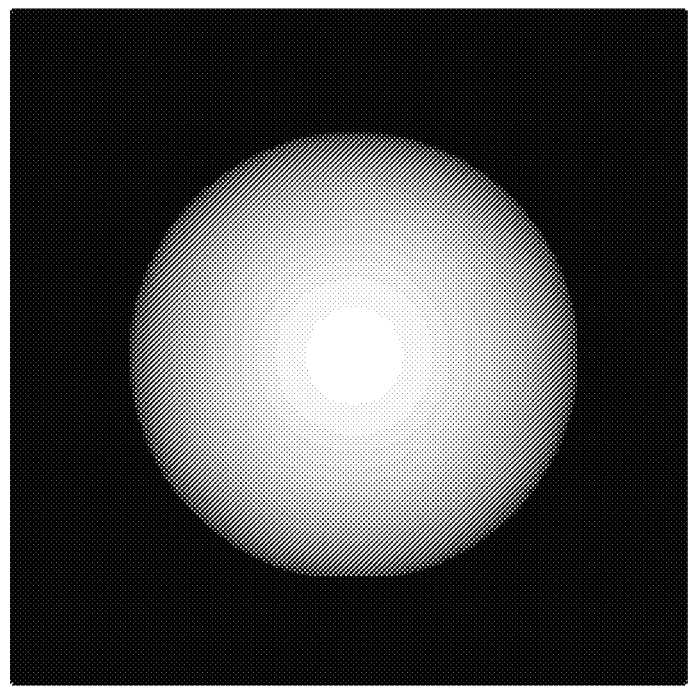
FIG. 2 shows a Lambertian sphere having uniform optical brightness.

As one of its shortcomings, texture characterization inherently fails to account for illumination and detection factors. Accurate color shade characterization for a tooth or other intraoral feature includes consideration for the surface geometry and the angle of illumination that is incident on the tooth. To illustrate effects related to shape, FIG. 2 shows a Lambertian sphere having uniform albedo, that is, uniform optical brightness response, where the ratio of reflected to incident energy is constant. In appearance, however, the intensity profile of the brightness decreases as the cosine of the surface normal relative to detection. As brightness decreases, the captured color texture changes accordingly. However, color shade is a property of the material of the object being scanned and its measurement should be independent of the illumination/observation geometry.

Figure 3:
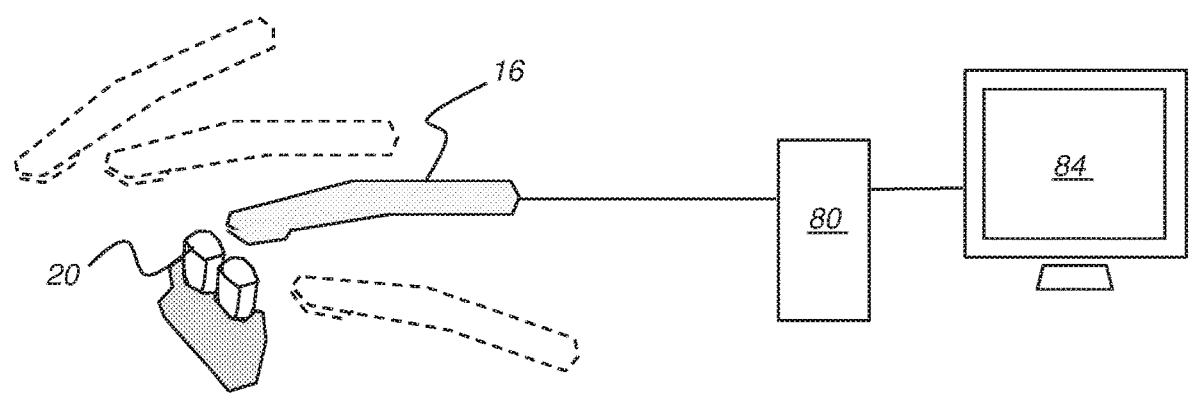
FIG. 3 is a schematic diagram showing an intraoral imaging probe at different positions relative to a tooth.

Example embodiments of the present invention take advantage of the capability of an intraoral imaging device to obtain multiple reflectance images of the same feature, such as the same surface of a tooth, from different angles, as shown in FIG. 3 from an intraoral imaging camera 16. The combined angular illumination and reflectance information extracted from different images can then be used to more closely characterize the color shade of each imaged tooth or other surface feature.

An angular distribution of color vectors describes a mapping that relates angular coordinates to a corresponding color vectors, wherein the angular coordinates depend on the illumination direction, observation direction, and a surface normal, and color vectors represent values in a standard color space, such as RGB, CIELAB XYZ (defined by the International Commission on Illumination), or a visible spectrum. According to an example embodiment of the present invention, an angular distribution of color vectors can be represented by a BRDF (Bi-Directional Reflectance Distribution Function) structure or a BRDF snapshot.

In the context of the present disclosure, the phrase "spatially resolved angular distribution of color vectors" describes an angular distribution of color vectors having a spatial variation. The spatial variation is used to parameterize the variation of the optical response of a tooth over its surface. The spatially resolved angular distribution of color vectors is a function which relates spatial coordinates to a corresponding angular distribution of color vectors. This function is used to associate spatial coordinates of one or more points from the surface data with the corresponding angular distribution of color vectors. The spatially resolved angular distribution of color vectors can provide continuous or discrete variation of the corresponding angular distribution of color vectors with a variation of the spatial coordinates.

Bi-Directional Reflectance Distribution Function (BRDF)

The Bi-Directional Reflectance Distribution Function (BRDF) provides a way to more accurately characterize the effects of illumination and observation at various angles on color shade. Use of this function can characterize the color shade of the material itself while reducing the confusion resulting from the contributions of illumination and detection angles. With respect to a single color, BRDF for surface characterization of a material with the scanner is expressed as a function of related variables:

$$f_r(\omega_i, \omega_r, n) = \frac{dL_r(\omega_r, n)}{dE_i(\omega_i, n)} = \frac{dL_r(\omega_r, n)}{L_i(\omega_i, n)\cos\theta_i d\omega_i}$$

where
L is radiance, power per unit solid angle, per unit perpendicular area;
subscript $_r$ relates to reflected light; subscript $_i$ relates to incident illumination;
E is irradiance, power per unit area;
$\omega_i$ is the incident light direction;
$\omega_r$ is the reflected light direction; and
n is the local surface normal at a given point BRDF is expressed in units of inverse steradian $sr^{-1}$. The basic geometry for measurement to obtain BRDF variables for points on a surface is shown schematically in FIG. 4A. Line h is the half-direction between $\omega_i$ and $\omega_r$, described in more detail subsequently.

The generic BRDF for monochrome surface data has four dimensions, two (azimuth and zenith) per each of incident and reflected light angle. For the Applicants' system for intraoral imaging, two constraints apply: (i) a fixed illumination and detection angle are dictated by the design of intraoral camera 16; and (ii) the BRDF data for a surface point is assumed invariant to rotation about the normal.

BRDF data for monochrome surface data can be extended to BRDF color data for a color surface data by separately considering each color channel from the color surface data. In one example embodiment, an angular distribution of color vectors is represented as BRDF color data, where BRDF color data records the correspondence between the illumination direction, the reflected direction, and the surface normal on one hand, and the acquired color vector on the other hand. In an example embodiment of the present invention, the BRDF data are represented by a two-dimensional RGB image.

Figure 4A:
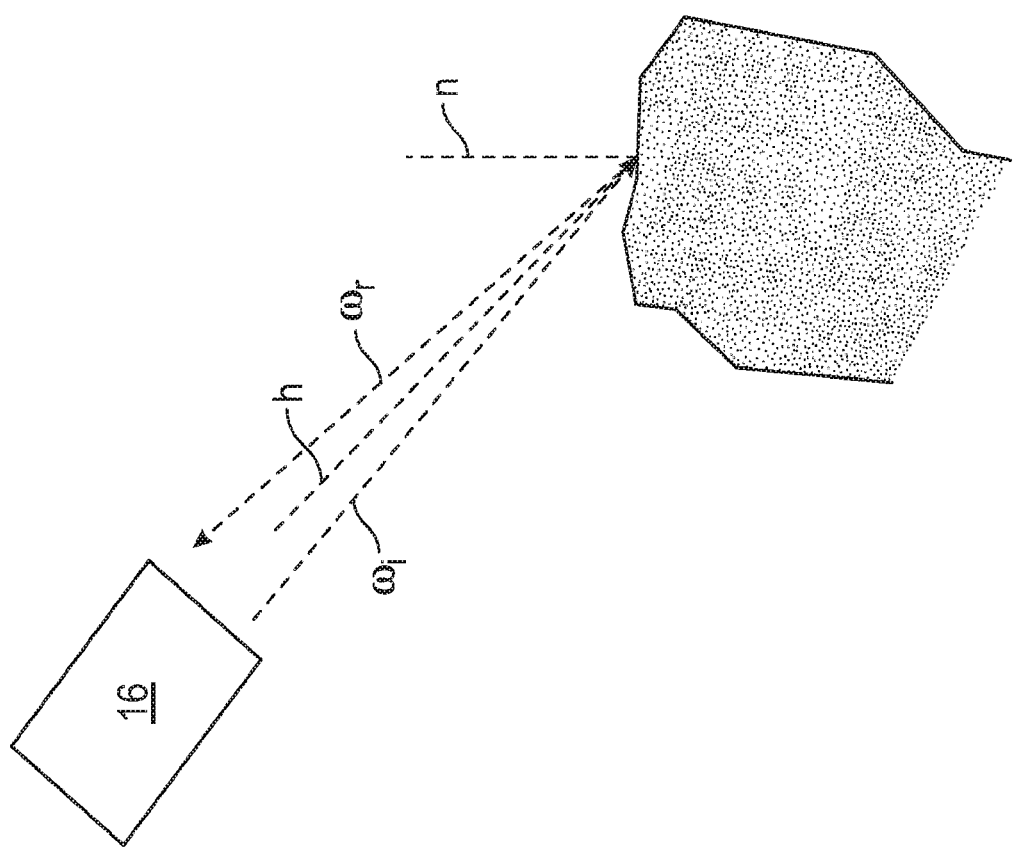
FIG. 4A is a schematic diagram showing basic geometry for Bi-Directional Reflectance Distribution Function (BRDF) variables.
Figure 4C:
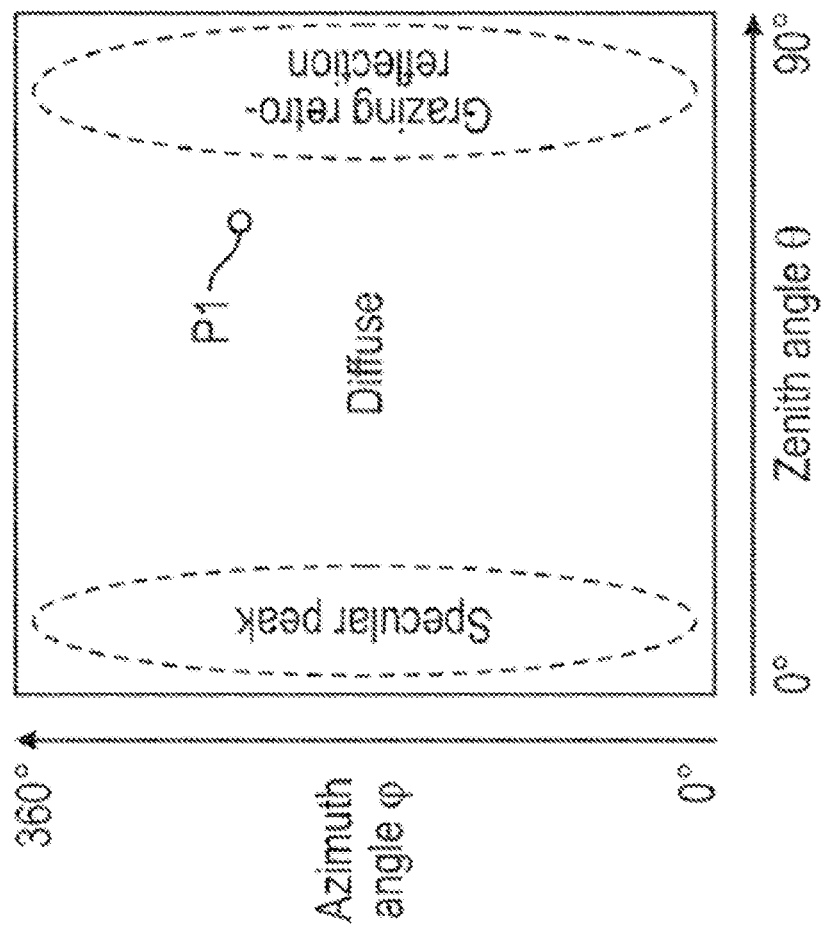
FIGS. 4B-4C include a schematic diagram showing the definition of polar angles and how the measured reflectance data for a surface portion is schematically represented.
Figure 4B:
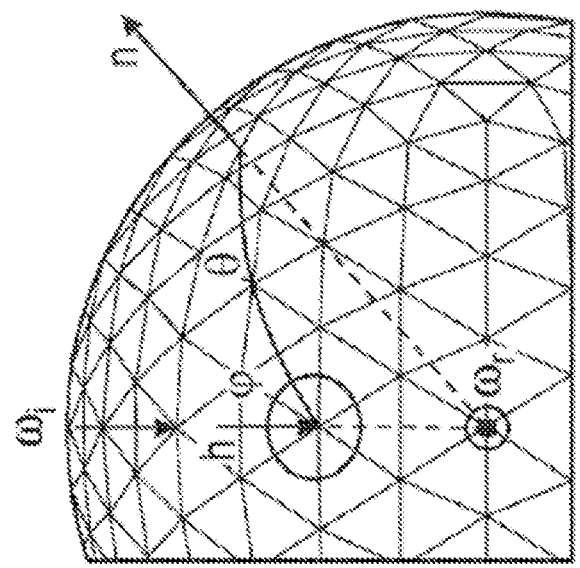

FIG. 4B shows angle geometry on the left and FIG. 4C shows the content of a BRDF two-dimensional "slice" in schematic form on the right, termed a BRDF structure in the present disclosure. The two-dimensional (2D) structure is a known representation of a section of the generic BRDF having four dimensions. In the context of the present disclosure, due to the fixed illumination/sensor symmetry of the Applicant's intraoral imaging system, the BRDF structure represents the BRDF information corresponding to a color shade.

The definition of angles at the left in FIG. 4B is obtained from the half-direction h and the surface normal n. The zenith angle $\theta$ and azimuth angle $\varphi$ provide polar coordinates of the surface normal n, relative to the half-direction h. The origin and direction of angle $\varphi$ can be arbitrarily chosen, relative to the input directions ($\omega_i$, $\omega_r$), but must be consistent with the scanner coordinate system throughout the scan.

The two-dimensional (2D) BRDF structure is defined for a half-direction or half-angle h representing the mid-vector between the illumination optical axis for incident light direction $\omega_i$ and the detector optical axis for reflected light direction $\omega_r$, as shown in FIG. 4A. In the FIG. 4C graphical representation, the horizontal axis represents the zenith angle $\theta$ between the surface normal n and the half-direction h over a range of 0 to 90 degrees, with the 0 degree orientation at furthest left. The vertical axis represents the azimuth angle between the surface normal n and the half-direction h over a range of 0 to 360 degrees. This type of mapping arrangement includes the positions of standard contributions in rendering, such as specular peak, retro-reflection, and diffuse light.

Specular reflection is typically the intense bright reflection observed on metallic surfaces when the observer is opposite to the illumination with respect to the surface normal. Specular response depends primarily on surface polishing, but does not impact the selection of the block shade used for milling. Specular response often saturates the detector, compromising the value of shade measurements in that area of the two-dimensional (2D) slice. This specular peak occurs when normal n and half-direction h are approximately aligned, as shown along the left side of the 2D BRDF mapping of FIG. 4C.

Diffuse response is measured over the broad range of zenith angles $\theta$ and azimuth angles $\varphi$ over most of the slice. Grazing retroreflection is measured over a narrow range of angles where incidence oi, reflection or, and half-direction h are near alignment, as designed by the handpiece geometry constraints, but the surface normal n is tilted by 90° relative to them. When modeling the physical properties, the grazing retro-reflection usually determines the type of micro-facet distribution, i.e. the surface roughness at the microscopic level. This illustrates an angular separation of various physical effects which characterize a surface appearance. Grazing retro-reflection shows properties under grazing incidence relative to the normal direction, which are not natural ways of observing a patient's teeth. In addition, depth information and therefore the surface normal are more difficult to identify and measure in such geometry.

For intraoral shade matching, the diffuse region of the FIG. 4C mapping is of the most interest. Specular and grazing retro-reflected light are of much less value, for the reasons just described. A single point P1 in the BRDF structure shown in FIG. 4C represents the BRDF value $f_r$ ($\omega_i$, $\omega_r$, n) for each color that results from illumination at a given illumination direction $\omega_i$ at a given detector direction $\omega_r$, for a given relationship to the normal n, at the corresponding point along the surface contour.

The associated depth information with assigned colors is measured by the camera in the scanner coordinate system, which is independent of the placement of the scanner in the common coordinate system. In the scanner coordinate system, the incident and reflected light directions are constant, so that directions $\omega_i$, or, h are constant and only the local surface normal n depends on the associated depth information. In the scanner coordinate system, associated depth information provides the local surface normal n for a given point. The local surface normal n and the assigned colors are used to compute a BRDF value for that point. The following sections describe how the BRDF values acquired by the camera can be organized into a common coordinate system in which the growing surface contour is defined.

Scanner Orientation to Update the Growing Surface Contour

The associated depth information with colors derived from the image data is used to build a successively enhanced or growing surface contour. A point cloud with normals and colors provides suitable flexibility for point cloud development during the acquisition (fast point insertion, deletion); however, colored/textured surface meshes are generally displayed to the user on display 84 (FIG. 1).

Point cloud or mesh data structures can be used equivalently to represent the three-dimensional (3D) surface. A point cloud with normals and colors can be extracted from a colored/texture mesh, such as by using vertices from the mesh and their average triangle normal and vertex color, discarding the triangle data. A mesh with colors can be generated from a point cloud having normals and colors using algorithms such as described in "Screened Poisson Surface Reconstruction" by Kazhdan, M., & Hoppe, in *ACM Transactions on Graphics*, 32(3), 1-13, (2013) or using a variant of Vrip, as described by Brian Curless and Marc Levoy in "A Volumetric Method for Building Complex Models from Range Images", Proceedings of SIGGRAPH96, adapted to take a point cloud with normal and color data as the input instead of range images from the original algorithm. Without loss of generality, the term "surface contour" can be equivalently represented using a "surface mesh" or a "surface point cloud". Conversions between point clouds and meshes are known to those skilled in the surface contour imaging arts.

According to an embodiment, both mesh and point cloud structures can be used to generate the surface contour, shown on the display. The point cloud with normals and colors is the dynamic structure, combining the information from all input stitched image data. The color mesh can be generated from the point cloud at a low resolution as a temporary structure for display. The color mesh can be regenerated with each update in order to be synchronized with the accurate point cloud with colors and normals.

The associated depth information with colors can be converted into a surface contour with colors. Normal information for each point of the surface contour can be estimated using well-known techniques in computer graphics, such as those described, for example, at the pointclouds.org website under documentation/tutorials/normal_estimation.php. At a query point, a local neighborhood of points is defined. The covariance matrix is computed using the local neighborhood of points. The covariance matrix C has the form:

$$C = \frac{1}{k}\sum_{i=1}^{k} \cdot (p_i - \bar{p}) \cdot (p_i - \bar{p})^T$$

wherein k is the number of points in the local neighborhood, $p_i$ values are the point coordinates and $\bar{P}$ is the average point location from the points in the local neighborhood. This square, symmetric 3×3 matrix can provide eigenvectors and associated eigenvalues. If a least-square fit of the local neighborhood of points is performed using an ellipsoid, the ellipsoid axes would be the eigenvectors and the axis length would be related to the corresponding eigenvalues. The smallest eigenvalue of the covariance matrix represents the shortest ellipsoid axis and the associated eigenvector gives the direction of the local normal. The direction of the local normal can be flipped if necessary to match the observation direction from the scanner. This local normal is then assigned to the query point, which allows the computation of a surface contour with normals and colors.

Stitching Procedure

The stitching procedure of the surface contour with normals and colors from the acquired image data onto the growing surface contour includes the following generic steps: (a) estimate one set of feature descriptors for the surface contour with normals and colors from the image data and for the growing surface contour; (b) perform feature matching using both sets of feature descriptors to generate a relative placement and a score; (c) accept or reject the relative placement based on the score; (d) refine the relative placement using an iterative closest point algorithm and generate a distance measure; and (e) accept or reject the relative placement based on the generated distance measure. Details for these steps are as follows:

(a) Feature descriptors for a surface contour represent a local surface description which is invariant to rigid transform (rotation/translation). For instance, the Fast Point Feature Histogram (FPFH) can be computed for each query point of the surface contour with normals. This is described, for example in the dissertation of Rusu, R. B., "Semantic 3D Object Maps for Everyday Manipulation in Human Living Environments", pp. 57-61, (2009 Aug. 17)). Other descriptors can be used which also include the color information from the point cloud.

(b) Feature matching between a set of feature descriptors from a moving surface contour with normals onto a set of feature descriptors from a target surface contour with normals involves the generation of correspondences between feature descriptors. FPFH feature descriptors are histograms and the distance can be defined as the norm of the histogram difference between two feature descriptors. A correspondence is defined as the smallest distance from one feature descriptor onto the other set of feature descriptors. Feature matching then involves the selection of a group of correspondences to generate a relative placement. This step is usually performed using the Random Sample Consensus (RANSAC) algorithm, which consists of the random selection of three correspondences to compute a candidate relative transform and then counting the number of correspondences consistent with this candidate relative transform. A correspondence is formed of two feature descriptors, one from the moving point cloud and one from the target point cloud with normals. Each feature descriptor corresponds to a query point. A correspondence is consistent with the candidate relative transform if the moving query point, moved using the candidate relative transform, is within a predefined distance from the target query point. The candidate relative transform with the highest number of consistent correspondences becomes the final relative placement. The score indicates the quality of the final relative placement and can be the corresponding number of consistent correspondences.

(c) The relative placement may be rejected in the event that the score is below a predetermined threshold. In this case, stitching is not possible and the image data are discarded.

(d) The refinement of the relative placement using an iterative closest point (ICP) algorithm defines point correspondences between the moving and target surface contours by finding the closest match when the relative placement is applied onto the moving surface contour. A least-square distance minimization between matches provides an update of the relative placement. The choice of point correspondences and update of the relative placement is then repeated until convergence or until a predefined number of iterations has been reached. The distance measure can be the value of the cost function used for least-square distance minimization, corresponding to the final updated relative placement.

(e) The updated relative placement can be rejected if the distance measure is below a predetermined threshold. In this case, stitching is not possible and the image data are discarded. Otherwise, stitching is successful. If stitching is successful, the final relative placement of the surface contour with normals and colors from the image data onto the growing surface contour is known. This yields a common coordinate system for all the computed surface contours with normals and colors, into which points can be added, updated, merged, or deleted in order to create a growing surface contour. There is also the original coordinate system of the scanner, which corresponds to the axes of the image data, as originally acquired before stitching was performed. The common coordinate system is usually defined relative to an arbitrary orientation of the scanner during the acquisition of the first image data.

Sequence for Acquiring and Using BRDF for Intraoral Imaging

Figure 5:
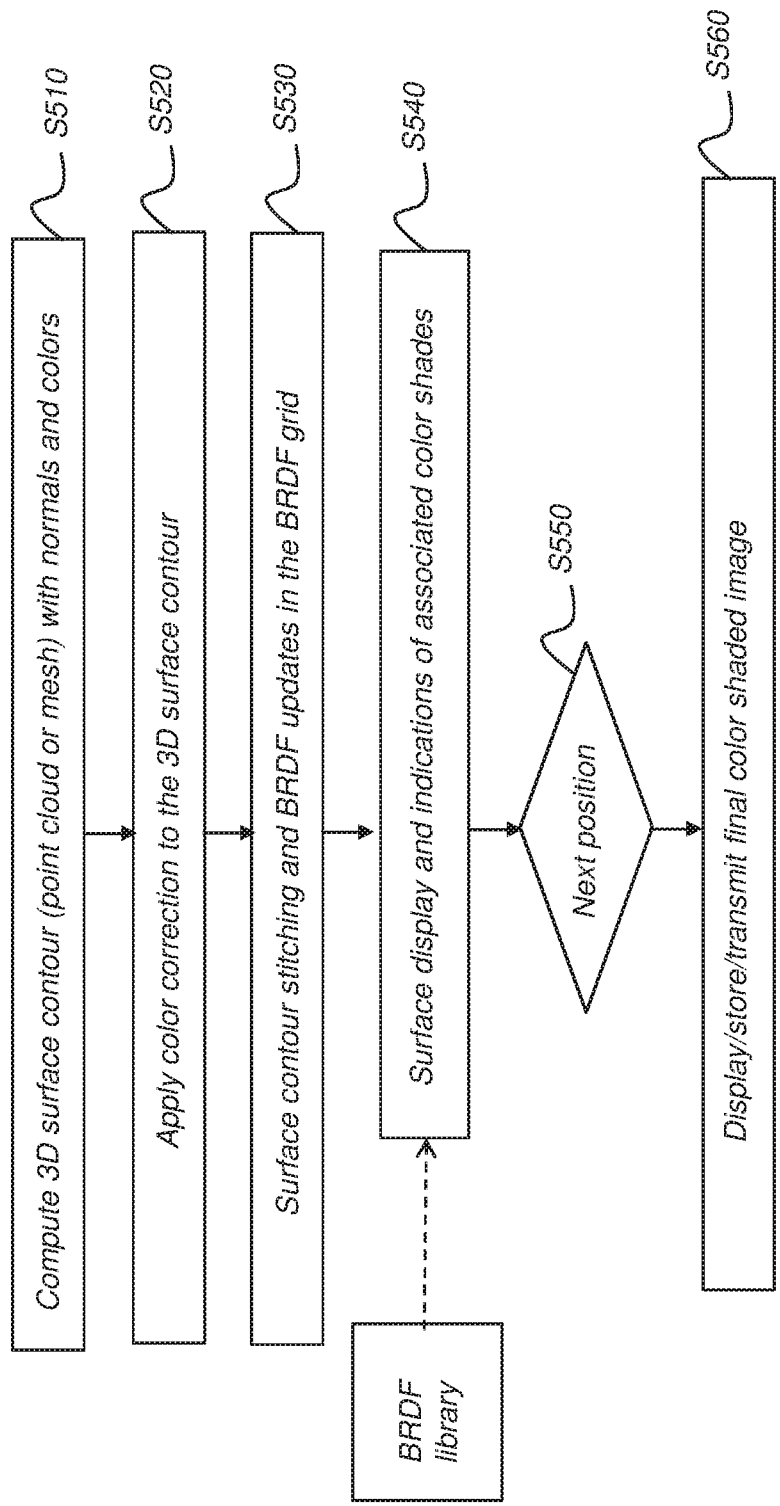
FIG. 5 is a flowchart representation of a method for acquiring and using BRDF data for improved color shading identification and display according to an example embodiment of the present invention.

The flowchart representation of FIG. 5 shows a sequence for acquiring and using BRDF structure for improved color shade identification and display according to an embodiment of the present invention. In an acquisition and processing step S510, a surface contour image is obtained as a point cloud or mesh, with normals and color information from the acquired image data. A color correction step S520 converts colors from the point cloud to BRDF color data using $f_r(\omega_i, \omega_r, n)$ for each color channel and using the illumination direction $\omega_i$ and detector direction (% in the coordinate system of the scanner during acquisition of image data (before stitching). Step S520 may be postponed to a later stage, but immediate color correction in order to produce BRDF values allows a better normalization of the colors early in the processing pipeline, so that corrected colors become more accurate representations of the tooth material and less dependent on the illumination/detection geometry. Using this method, all subsequent data structures that are generated benefit from corrected color values.

Each identified point from the surface contour contains at least a spatial three-dimensional position, a normal vector, and a color vector (typically RGB color). A stitching step S530 defines a relative position of the surface contour from the acquired image data into the coordinate system of the "growing" surface contour, that is, the surface contour being actively generated. Upon successful stitching, the spatial point position in the coordinate system of the growing surface contour can be obtained.

Spatially Varying BRDF (SVBRDF) uses a spatially resolved BRDF, which adds the point position information to the distribution function. An SVBRDF can be represented by using a regular BRDF grid structure, defined in the same coordinate system as the growing surface contour. The grid cell size (voxel size) is typically the desired spatial shade resolution, typically varying between 1 mm and 20 mm when using an intraoral scanner. The dental technician or practitioner generally separates a tooth into one to three shades, thus using a typical grid cell size of 5 mm to reach this spatial resolution. The point position after stitching provides a coordinate in the BRDF grid structure. The corresponding BRDF grid cell contains the BRDF structure to be updated.

The generic BRDF function $f_r(\omega_i, \omega_r, n)$ introduced above is sampled during the scan, under various observation/measurement geometries, around a given point with normal direction n. Each sample is one of the BRDF values introduced above and those values can be stored in a BRDF structure of the same dimension as the BRDF function. For the Applicant's system, the BRDF structure is a two-dimensional image as noted previously. The update to a BRDF, coming from a point, is made in the following way: the point position and the point normal, in the scanner coordinate system, are used to compute the angular coordinates in the BRDF structure. The corresponding pixel stores a weighted sum of corrected colors together with a total weight for that pixel. The average BRDF color for that pixel can be obtained at any time by dividing the weighted sum of corrected colors by the total weight. One pixel represents an angular range of the BRDF function.

The weight corresponding to a point represents relative confidence in the measurement. A default weight can be 1 and may be decreased according to relative uncertainty in the point position, uncertainty in the point normal direction, or uncertainty from matching criterion, for example. For example, uncertainty in normal direction can be computed from the ratio between the smallest eigenvalue and the second smallest eigenvalue. If the ratio is close to 1, both eigenvalues are similar and the choice of normal is ambiguous. Above a predefined threshold, for instance 0.5, the corresponding weight for that point may be decreased. Similarly, the stitching finishes with an estimation of the distance measure, which can be compared to a predefined threshold to eventually decrease the weight for all the points in that view.

Pixel size is chosen so that the angular range is similar to the angular noise in the estimation of the normals of the point cloud. Typically, each pixel represents an angular variation of 5 to 20 degrees along each axis. In this two dimensional (2D) image, the horizontal and vertical axes represent the zenith and azimuth angles, respectively, between the surface normal and the half-direction.

More complex models exist, such as the Bidirectional Surface Scattering Reflectance Distribution Function (BSSRDF) or the Bidirectional Texture Function (BTF) or Bidirectional Scattering Distribution Function (BSDF). Each of these models shows various properties of the scanned object. The physical property modeled by those functions may represent reflectance, scattering and/or shadowing, or masking. These distribution functions share the same common principle of an angular resolution of the color vector, as a function of incident and reflected light directions. The term "BRDF" used herein can refer to these similar angularly resolved bidirectional distribution functions that characterize light interaction at different points along a surface.

The two-dimensional (2D) BRDF data structure shown schematically on the right in FIG. 4C stores the color data for the BRDF. Alternatively, a model of the corresponding surface property could be stored, with values distribution for reflection as well as transmission, scattering, and shadowing. These alternative data structures can express parameters that can be adjusted to match observed colors for light at given incident and output angles.

Alternative representations for representing a particular BRDF function can be used, provided that a BRDF distance between data points can be defined as a metric. A default distance could be obtained by using the BRDF distance described below for BRDF structures sampling the BRDF function at the pixel locations defined herein. For instance, alternative representations for a BRDF may be an analytic expression such as the Torrance-Sparrow BRDF, Cook-Torrance BRDF, the Phong BRDF which are popular in computer rendering applications. A more detailed list of BRDF models can be found in "An Overview of BRDF Models" by R. Montes and C. Urena in a technical report LSI-2012-001 from the University of Granada, incorporated herein by reference. This report describes analytic models with free parameters which are adjusted to match observations of BRDF values described in this disclosure. A typical adjustment method involves least squares minimization of the residual distance between measured BRDF values from the scanner and computed BRDF values from the analytic model.

Continuing with the FIG. 5 sequence, a contour forming step S540 forms the display of the growing surface contour, including indications of associated color shade. For each BRDF structure, an associated color shade is computed using a separate BRDF library. The BRDF library is a set containing color shade values and associated BRDF structure. The creation of the BRDF library is described in more detail below.

BRDF Distance

The evaluation of two BRDF functions at one point, P1, as depicted in FIG. 4C gives two BRDF values. In the context of the present disclosure, a BRDF value is also termed a color vector. The concept of distance between the two BRDF values is defined hereafter. The BRDF distance between two BRDF functions can be defined as the integral of color distance over all permitted positions of point P1. Differently stated, the integration domain covers the angular range of input variables $\omega_i$ and $\omega_r$.

Where a BRDF data structure is a two-dimensional (2D) image (similar to the BRDF structure shown in FIG. 4C) wherein each pixel stores a weighted sum of colors and a total weight, a BRDF snapshot can be defined as a two-dimensional (2D) image having the average color vector (obtained by division of each pixel value by the total weight). If the total weight is zero or is below a predefined threshold, the weighted sum of colors can be considered to be unreliable. In this case, the average color vector can be replaced with an invalid color vector, such as RGB=(−1.0, −1.0, −1.0).

A BRDF structure accumulates information throughout the scan duration. The stored information represents a sum of contributions to each pixel. A BRDF snapshot performs averaging (keeping the original BRDF structure unchanged) and has a short lifetime; its data is valid only at the time it is generated, during the BRDF distance computation. As soon as new three-dimensional (3D) points from subsequent image data affect the BRDF structure, the averages for the BRDF snapshot can be refreshed.

In a general case, color difference in any dimension can be represented as a vector difference, such as by the computed norm of the color difference. If one of the two color vectors is invalid, as described above for a value considered unreliable, the color distance can be set to a predetermined distance value. BRDF distance between two BRDF snapshots is a weighted sum of color distance for all corresponding pixels.

The weights from this weighted sum are derived from the discretization of the integral of color distances over the integration domain. For the Applicant's system, with polar coordinates used for the BRDF structure and the BRDF snapshot, the integration element (for weights) is of the form $\sin\theta d\theta d\varphi$, evaluated for the angular coordinate at the center of each pixel.

The BRDF snapshot can also be used to convert colors from the original BRDF structure (such as RGB values) to a color space that is better suited for evaluating color distance (such as the standard CIELAB color space familiar to those skilled in the imaging arts). For a given BRDF structure, the associated color shade from the BRDF library is the shade value corresponding to the smallest distance between the BRDF snapshot from a given BRDF structure and BRDF snapshots from the associated BRDF structures inside the BRDF library. The associated color shades are the shade values from the BRDF library for each of the BRDF structures from the BRDF grid.

The indication of associated color shades may be a label corresponding to an associated color shade. For example, a label can be the corresponding text or an arbitrary color representing the associated color shade from the BRDF library. In general, an "indication of a shade value" is a labeling that identifies a shade value. This type of labeling can be provided for multiple shade values, for instance by combining a number of text labels or color labels.

As an example, a color shade prescription for a tooth can include more than one shade, such as "D2-A2-A3", which may represent the upper-third, the middle third and the lower third of the tooth according to a particular practice. Alternately, shade values for a tooth can be indicated using text labels displayed on the surface data, where each shade value provides a text label which is shown at the points from the surface data corresponding to the angular distribution of color vectors used to determine the shade value. According to an alternate example embodiment, the indication of one or more shade values can include one or more color labels displayed on the surface data, wherein each shade value is associated to a color label that is shown at points from the surface data corresponding to the angular distribution of color vectors used to determine the shade value.

The growing surface contour and the BRDF grid are in the same coordinate system. Because of this, the associated color shades can be displayed in accordance with corresponding surface locations. If colors are used for labels, each point from the growing surface contour has corresponding coordinates in the BRDF grid and can be assigned the color of the label of the color shade from the BRDF library associated with the BRDF structure at that coordinate. In this way, all of the displayed surface contained in one BRDF cell can be rendered with the same color label. Alternatively stated, two neighboring points on the growing surface contour are very likely to correspond to the same cell in a BRDF grid (described subsequently). The two points, therefore, can be assigned the same color label. By extension, the surface area clipped by the BRDF structure can be rendered with the same color label. If text is used for labels, the position of the text label relative to the growing surface contour may be the center of the BRDF cell in the same coordinate space. It may also be the center of the selected area by the operator.

Next position step S550 repeats the process, moving to the next set of image data from the camera for processing at step S510. According to an alternate example embodiment, surface contour generation can be completed first, using the tooth colors as originally acquired. The BRDF data is acquired, but not applied during initial surface contour generation. Surface contour stitching can then be followed by shade matching processing using acquired BRDF data.

For this alternate method, step S540 is effectively executed after next position step S550 and its corresponding process loop.

According to an alternate example embodiment, shade matching is performed following the conventional three-dimensional (3D) scan process, so that shade data are added to existing three-dimensional (3D) surface data. Shade matching using angular information then begins following the conventional three-dimensional (3D) scan or can use imported three-dimensional (3D) scan data for the patient. Stitching for shade matching using angular information is then performed against the existing surface contour. With this sequence, the operator can focus on a particular tooth or teeth to be treated. This procedure allows BRDF data acquisition and shade label display to be provided for only the region of interest for restoration, for example. In practice, the same shade acquisition sequence is followed. The initial BRDF data structures are empty, but the surface contour is non-empty.

According to another alternate example embodiment, the operator can select a limited region of patient dentition for which shade labels are of interest, such as based on the treatment plan, for example. In such a case, the rendering of the shade label on the displayed surface is limited to the selected region or limited to within a predefined distance from a selected area. Selection can be performed using a pointer such as a computer mouse, using input from a tablet, or using some other digital input interface. Selection can be made before or after three-dimensional (3D) scanning. For the latter, during the three-dimensional (3D) scan process, shade data are generated but not displayed on the stitched surface contour. The shade-matched results can be displayed with shade indications, either on the selected region or on a separate area on the monitor screen, after the operator selects the region of interest. According to an alternate example embodiment, the shade label is some text corresponding to the shade tab from the shade library.

The stream of image data from the scanner can be stopped automatically, such as when valid information is no longer detected after a timeout period. Image data can also be stopped by the operator, such as by re-placement of the scanner back into a holder. These or similar events can be sensed in order to stop the scan. The user can then interact with the displayed surface so that the application displays, stores, or transmits the final shade-matched image. The final shade-matched image, which can be a color shaded image, for example, contains the displayed surface and the indications of the associated color shades in a display step S560.

Forming the BRDF Library

Figure 6:
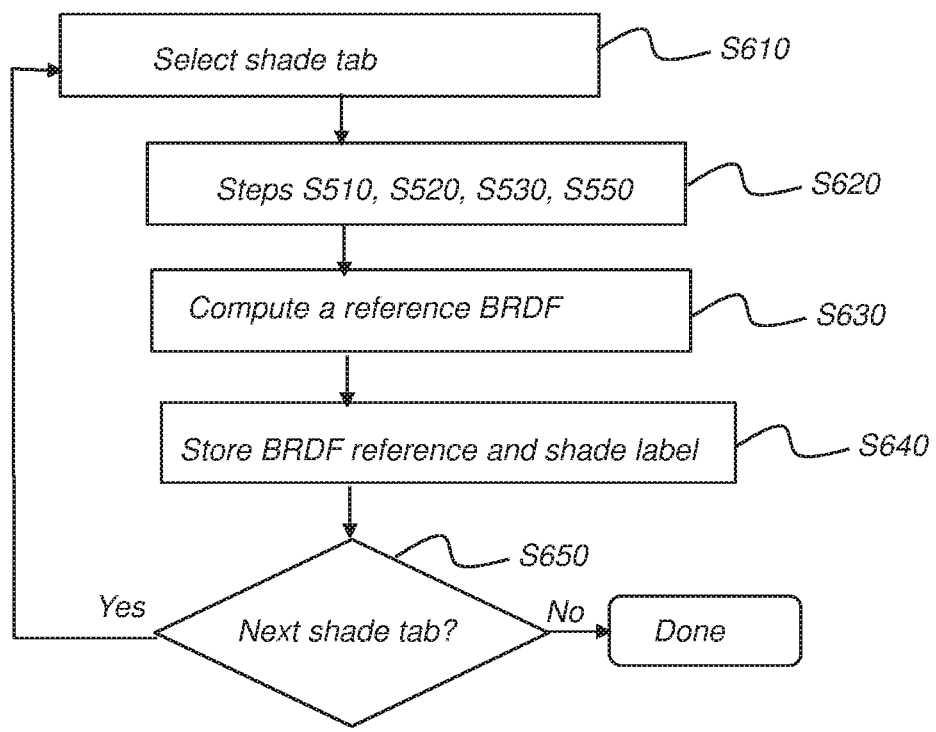
FIG. 6 is a flowchart representation of a method for forming the BRDF library used in the method of FIG. 5.

The logic flow of FIG. 6 shows steps for forming the BRDF library used in the method of FIG. 5. A collection of conventional shade tabs, commercially available from suppliers of dental materials, can be used for generating the BRDF library to be used for matching values in step S540 of the FIG. 5 method. Common shade values can be obtained from the Vita Classical® shade tabs (such as "A1" "A3.5" "D2") or Vita Linearguide 3D-MASTER® (such as "2L1.5" or "3M2") for instance.

In a selection step S610, one of the shade tabs is selected for the processing that follows. A color shade association step S620 combines FIG. 5 steps S510, S520, S530 and S550, which are repeated during surface scanning of the shade tab. At the completion of scanning, a compute reference BRDF step S630 automatically combines a number of BRDF structures from the scan into a unique reference BRDF. Step S630 aligns the shade tab with a reference coordinate system that is common to all of the reference shade tabs. Step S630 further automatically selects a group of cells and sums the BRDF structures into a single BRDF structure, designated as the reference BRDF for that shade tab.

The BRDF library represents a collection of reference BRDF and their associated shade labels. The BRDF library may be pre-recorded directly at fabrication and re-used during a scan of patient teeth. The BRDF library may also be generated by the practitioner, using preferred shade tabs. The practitioner simply needs to use a three-dimensional (3D) scanner device and follow the model outlined herein. This also allows the dentist to build a collection of shades by simply scanning them. The optical characteristics of the measurement system remain the same. The reference BRDF stored in the BRDF library may be a collection of the original BRDF data, the BRDF structure, or a fitted model. The reference BRDF can be a combination of some of the cells containing a BRDF function.

The surface contour is preferentially aligned in a similar coordinate system common to all shade tabs. Alignment is performed by stitching the growing surface contour onto a fixed reference surface of one of the shade tabs. All shade tabs from a set have usually a similar surface profile, but their appearance shows a gradient. The selected shade is based on industry convention. It is therefore important to align all growing surface contours into a similar coordinate system. This way, the corresponding BRDF cells in a predefined region can be selected and have a consistent meaning across the BRDF library.

Figure 9:
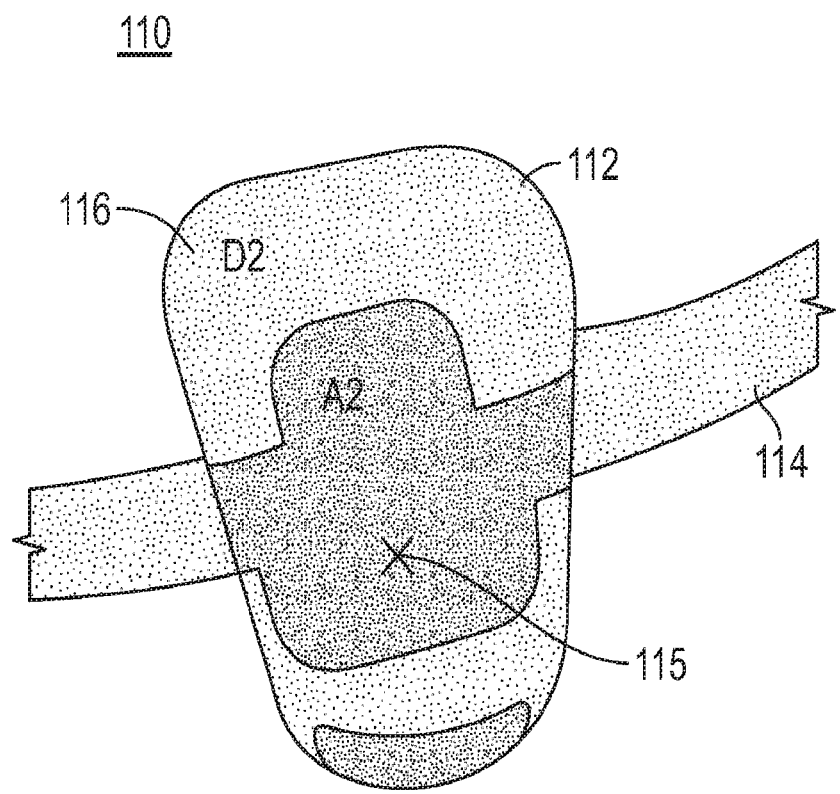
FIG. 9 is a schematic diagram showing a shade tab with regions of different shade values defined by BRDF.

FIG. 9 shows a shade tab with regions of different shade values defined by BRDF. The central region is identified as A2, but the incisal edge is D2 or other shade value. The present invention aims for a more precise shade measurement by comparing equivalent anatomical regions. If the strategy from FIG. 10B is used, we could expect a three-dimensional (3D) surface entirely detected as A2 for that A2 shade tab.

The reference BRDF is defined as the sum of all the BRDF structures from the selected BRDF cells in the predefined region. The sum is performed by pixelwise accumulation of all the weighted sums of colors and the total weights individually.

The statistical law of large numbers holds that collecting more observations leads to more accurate mean value, i.e. smaller standard deviation. The purpose of the pixelwise accumulation of BRDF structures in a predefined region is to obtain a more accurate mean estimation when computing the BRDF snapshot of the reference BRDF during BRDF distance measurement.

The predefined region can be a sphere of about 2 mm radius, centered about a predefined position on the reference surface. The predefined position can be the intersection of the (Oz) axis with the reference surface, for example. A storage step S640 stores each BRDF reference and the associated label in the shade library. A decision step S650 controls looping operation, for systematic processing of the entire array of shade tabs from the set. At the conclusion of measurement, the BRDF library is generated and stored. It can then be loaded prior to the start of an intraoral scan.

A sphere radius serves to define the bounds for accumulation of BRDF information. The sphere radius for the predefined region is determined based on the local variability of the shade appearance over the shade tab. At minimum, a single BRDF structure is selected from the cell containing the predefined position. Traditional methods for shade determination usually defines, at most, 3 shades for a canine, represented in bands; the radius is generally less than 5 mm to guarantee uniformity of the shade.

Figure 7B:
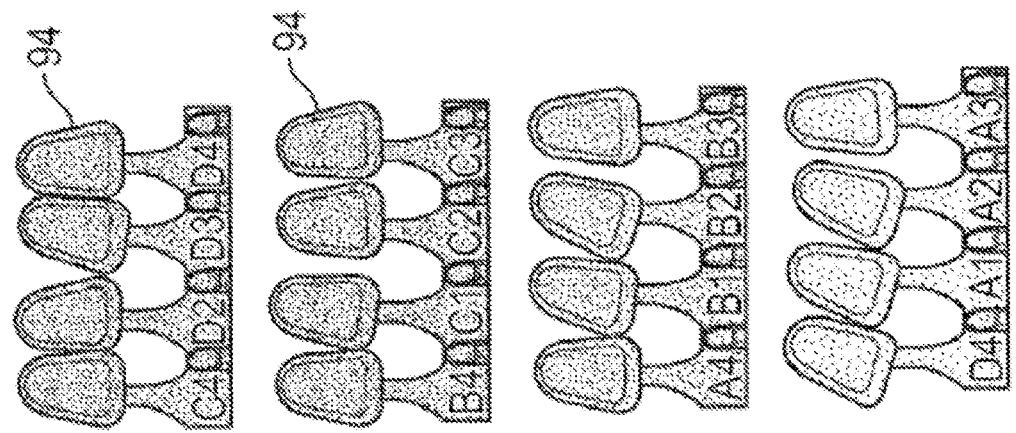
FIG. 7A is a diagram showing a set of shade tabs and FIG. 7B shows corresponding BRDF snapshots.
Figure 7A:
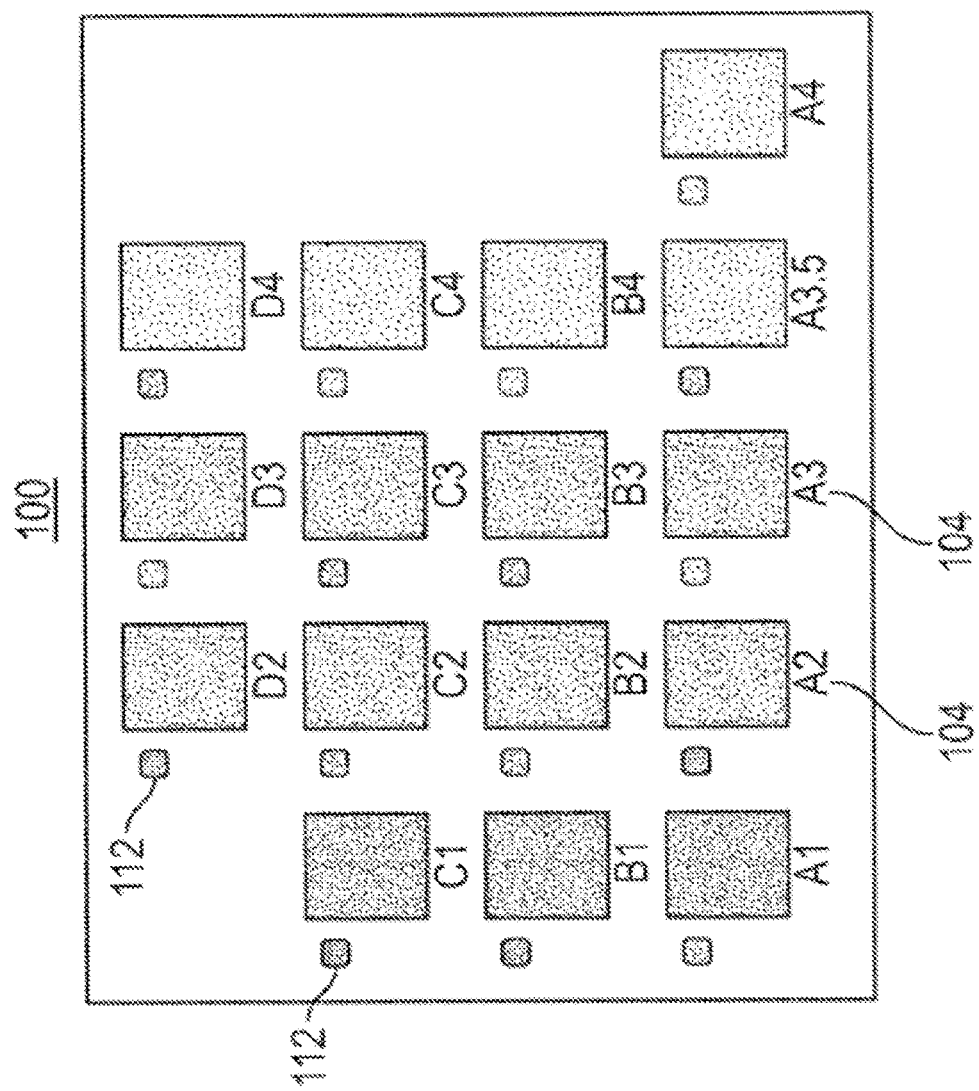

FIG. 7A shows a set of shade tabs 94 with corresponding BRDF reference structures (shown in FIG. 7B) contained in the BRDF library 100. Each BRDF reference structure is associated with a text label also named shade label 104 (D2, D3, D4, C1, C2, C3, and so on) and/or with color label 112. Those shade labels can also be stamped or otherwise recorded on the metallic support of shade tabs 94.

For conversion into CIELAB values, the signal from a white standard, defined as a surface having 90% reflectance, is acquired. Equivalently, in order to avoid saturation of the detector, the signal from an 18% reflectance standard (a N5 gray card) can also be used. The signal from the 18% reflectance standard is then multiplied by 5 to provide the equivalent of a white standard. The acquisition of a reflectance standard can be performed prior to the acquisition of the reference surface and the shade tabs for the shade library (in the FIG. 6 sequence of steps, prior to step S610). The signal from the reflectance standard can be stored inside the shade library. Data from the reflectance standard are then available for shade acquisition and also during the scan of actual teeth, because the shade library has been loaded into the computer memory.

In practice, data for the reflectance standard is also acquired using the three-dimensional (3D) scanner, by scanning the surface of the reflectance standard. After Steps S510 through S560 have been completed, a BRDF grid has been created. All BRDF structures from the BRDF grid can be combined into an accumulated BRDF structure, which is then converted into a BRDF snapshot. The average color vector from this BRDF snapshot provides an average reflectance standard color vector which can be used for conversion into CIELAB color space. The color vector can include a spectrum with wavelengths that encompass the visible wavelengths. In the context of the present disclosure, visible wavelengths lie in the range between 360 nm and 830 nm.

The conversion of a color vector into a CIELAB value using a reflectance standard color vector is a known procedure, which can be summarized as follows: (1) divide each color component from the corrected color vector by the color component of the reflectance standard color vector; (2) convert this normalized color vector into a tri-stimulus XYZ value; and (3) convert the tristimulus XYZ value into a CIELAB color.

The scan of the reflectance standard can provide more complex reflectance standard data. In one example embodiment, the average BRDF structure of the reflectance standard is directly recorded, instead of a simple average reflectance standard color vector. When this is done, when converting color vectors from a BRDF snapshot into CIELAB colors, the corresponding pixel from the BRDF snapshot of the reflectance standard can be used for color vector normalization. This technique can help account for angular variations of the reflectivity of the reflectance standard. In practice, the extended light source of the scanner, the non ideal illumination spectrum (because the illuminant is not D65) may introduce slight angular variations.

In another example embodiment, the scan of the reflectance standard provides spatially resolved color data. In particular, the spatial resolution can be expressed in the coordinate system of the scanner. This allows measurement of the variations of illumination and detection across the field of view. It can be represented as a three-dimensional grid, aligned with the coordinate system of the scanner, where X/Y axes represent the imaging plane and the Z axis represents the main optical axis of the scanner. Using a spatially resolved profile of reflectance standard color vector allows for a more correct normalization of color vectors across the field of view. This helps generate more CIELAB colors which become independent of the position of the surface in the field of view.

The BRDF Grid Structure

Figure 8:
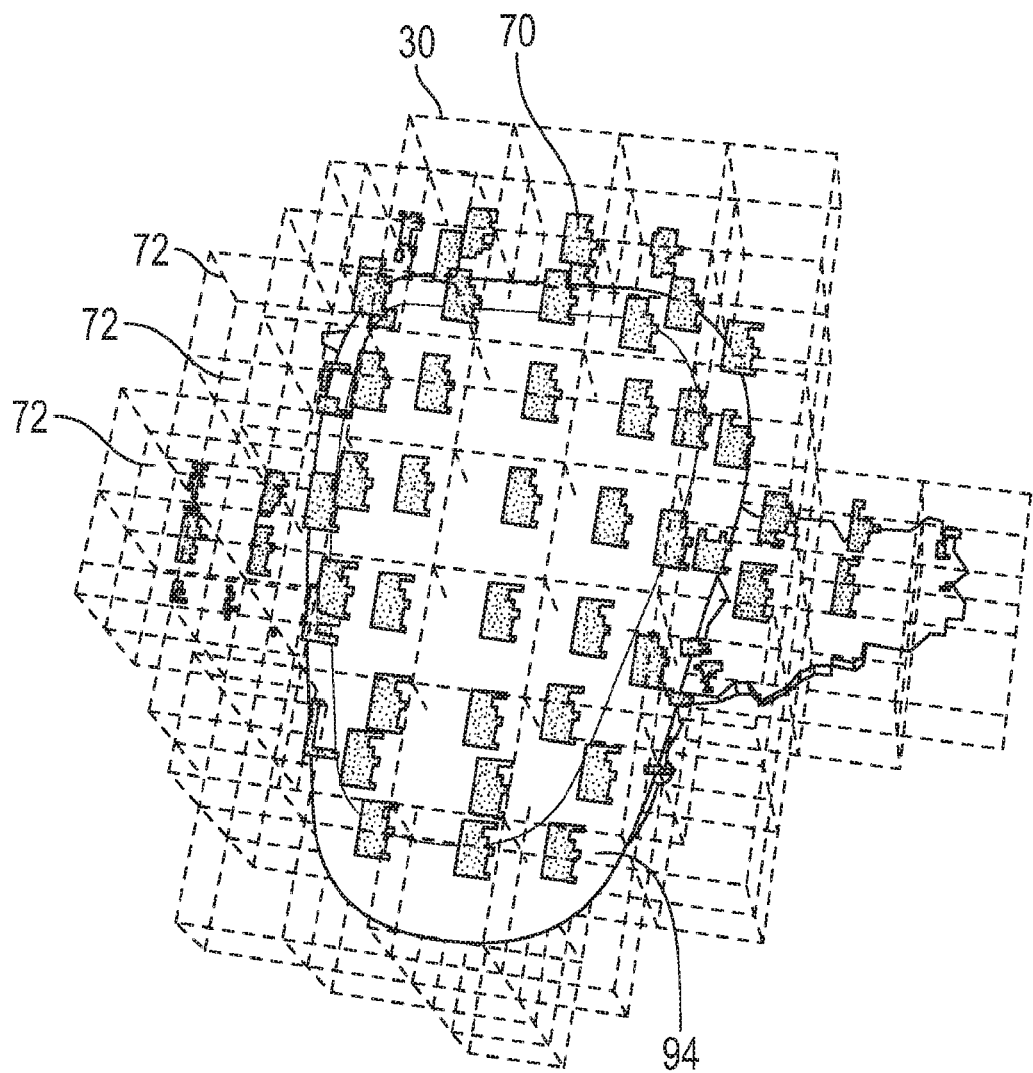
FIG. 8 is a schematic diagram showing a BRDF grid, BRDF snapshots and the growing three-dimensional surface contour in the same coordinate system.

FIG. 8 is a diagram showing multiple elements in the same coordinate system. A three-dimensional (3D) BRDF grid 30 composed of cells 72 defines a space partition encompassing the three-dimensional (3D) growing surface contour represented by a shade tab 94. Each cell 72 includes a BRDF structure 70 which is represented by the associated BRDF snapshot at that time during the scan. Each cell 72 corresponds to a small portion of the tooth surface, such as the surface intercepted by a single 1 mm$^3$ portion. During stitching step S530 (FIG. 5), as the point cloud with normals and colors is stitched onto the three-dimensional (3D) growing surface contour, those points with color and normal from the point cloud corresponding to a BRDF cell 72 are combined with the BRDF data structure 70 in that cell. If necessary, the BRDF grid 30 is extended so that all stitched points fall in a valid BRDF cell 72. Then, all the points from the point cloud are combined into the growing surface contour, which is updated on display.

Update to the BRDF structure in each cell 72 includes the following: (i) parameters of the normal to the tooth area corresponding to the partition; (ii) incident direction oi of the illumination; (iii) reflected direction $\omega_r$ of the detected light; and, (iv) color vector, in a well-known color space, such as RGB, CIELAB, or other suitable color space. The number of color channels may be more than three.

For a given geometry composed of an incident direction $\omega_i$ of the illumination, a reflected direction $\omega_r$ of the detected light, and a local surface normal n, the BRDF structure stores an angular distribution where each element (pixel) of the angular distribution stores a weighted sum of all the color vectors and the corresponding total weight. Thus, for the given geometry, the BRDF structure can be used to compute the average color vectors, which are stored in a BRDF snapshot.

The weights used in the weighted sum of color vectors and in the corresponding total weight can relate to the confidence (or quality) level of the acquired three-dimensional (3D) points as described previously, which represents a variable level of trust in the accuracy of three-dimensional (3D) point position, surface normal, or color. In addition, the weights may also vary with factors that can include: (1) decrease in saturated regions (specular cone) because precise point location become uncertain; (2) decrease as the local normal tilts away from the incident light or the measurement angle; and (3) increase if normals are consistent in the local neighborhood.

The geometry for illumination direction $\omega_i$, reflection direction $\omega_r$, and the normal n can be encoded into a two-dimensional (2D) angular coordinate in the BRDF structure in cell 72. A two-dimensional (2D) image structure is used to represent the angular range of the BRDF structure. Each pixel contains a weighted sum of color vectors and an associated total weight.

The resulting data structure for a region of the tooth is likely to be incomplete because the positioning of the scanner in a measurement sequence may not explore all the various angular combinations. At the beginning of the acquisition sequence, the BRDF distance is primarily driven by the default color distance. As additional data is accumulated in the BRDF structure during the scan, the BRDF snapshots contain more valid color values and the identification of the shade from the shade library becomes more and more precise. Computation can use a minimum threshold distance, below which the associated color shade from step S540 may be invalid. In such a case, no shade label is displayed for that region of the surface. This prevents very fast change of the associated color shade at the beginning of the scan. The shade appears when sufficient orientations have been accumulated in the pixels of the BRDF structure to be meaningful. According to an embodiment, BRDF distance can be expressed in DeltaE units, a standard metric for color distance in CIELAB color space. It is assumed that 50% of dental practitioners can visually detect a difference of 3 DeltaE (3 ΔE). The threshold for the maximum distance below which the associated color shade is invalid can then be set to 3 DeltaE or similar value (typically between about 1 DeltaE and 8 DeltaE).

BRDF data can be stored in memory or generated as needed from the intraoral camera and scanning apparatus. FIG. 8 provides one visualization of the data structures that can be used for accumulating and organizing the BRDF data acquired for a tooth resulting from step S540. It can be appreciated that such data structures themselves need not be visible to the operator.

Frequently, specular reflection saturates values from the image data, meaning that the associated depth information has no valid data for areas corresponding to specular reflection. There is no point and, therefore, no normal to compute coordinate in the corresponding BRDF structure after stitching of the rest of the surface contour. In case associated depth information is still available, close to the outer limit of the region of specular reflection, the depth information is frequently incorrectly estimated in that area. This means the normals may be very noisy. It may also happen that the reflectance images from the image data are saturated even if depth information is valid. Saturation happens because the dynamic range of the sensor is not sufficient. It is better to reject those erroneous measurements than to store them in the BRDF structure. Rejection can be implemented by setting a rejection threshold on the cosine of the point normal and the half-direction (for instance rejected if above 0.98). Another implementation would reject storage in the BRDF structure if the color of the point from the point cloud with colors and normals is close to saturation values of the camera (for instance if all color channels are above a value 250 for a range of the camera going up to 255). The reference BRDF obtained from a shade tab 90 can be stored, for example, as an element of the BRDF library, as described previously with reference to the flowchart representation of FIG. 6.

An example embodiment of the present invention adjusts the standard BRDF relationship at step S520 to the following:

$$f_r(x, \omega_i, \omega_o, n) k E_{pix} \frac{r_{led \to x}^2 r_{x \to pix}^2}{(\omega_i \cdot n)}$$

where: k is a constant term provided that the illumination is constant and scanner geometry remains constant;
  value $E_{pix}$ is measured irradiance (i.e. proportional to the camera pixel value, the observed color for a particular color channel);
  the dot product of $\omega_i$ and n gives the cosine angle between the local normal and the illumination direction; and
  $r^2$ terms are quadratic distances from the scanner components to the surface position. The above formula can be used when converting the original point cloud colors into corrected colors. The formula is derived from the generic definition $f_r(\omega_i, \omega_r, n)$ given previously in the present disclosure. The quadratic distance terms are corrections due to the variation of solid angle with distance. The cosine correction from the dot product comes from the denominator in the original definition of $f_r(\omega_i, \omega_r, n)$. This color correction can be applied to each color channel individually.

An improved measurement of the distance between two BRDF structures could use an underlying model defined by a fixed number of parameters. A paper by M. Langovoy et al. gives a possible implementation: "Novel metric for analysis, interpretation and visualization of BRDF data", *ACM Transaction on Spatial Algorithms and Systems* (2014). (See eq (8) or (15) as examples of a metric). This implies fitting the recorded two-dimensional (2D) BRDF structure onto a model by optimizing parameters and then computing a distance between those models.

The presently disclosed embodiments are therefore considered in all respects to be illustrative and not restrictive. The scope of the invention is indicated by the appended claims, and all changes that come within the meaning and range of equivalents thereof are intended to be embraced therein.

FIG. 9 shows a surface contour with shade indications, where the surface contour corresponds to a shade tab. A typical position of the reference position 115 for building the BRDF library is shown together with examples of shade indications using a text label 116 and a color label 112 for detected shades. A portion of the growing surface contour 114 is shown. FIG. 9 represents a possible representation 110 of the three-dimensional (3D) surface contour together with labels for the identified color shades, from Step S540. For each cell of the BRDF grid, each BRDF structure can provide one shade value. If the shade value is successfully identified, the surface in the corresponding region of space is rendered with a label 112 associated with that shade value. For example, the A2 shade from Vita Classical® shade tabs can be rendered using a light green, which is its arbitrary predefined color label.

The BRDF grid leads to a spatial variation of the label on the representation of the three-dimensional (3D) surface with labels. If the determination of a shade value is not successful because the smallest BRDF distance is larger than a predetermined distance threshold, the surface is not rendered with any label and therefore retains its original appearance of a colored mesh or textured mesh 114, since the colors or texture are independent of the BRDF shade library. In this example, the original appearance of a colored mesh 114 results from the fact that this metallic surface does not correspond to any similar material present in the BRDF library.

According to an example embodiment of the present invention, intraoral imaging apparatus 90 of FIG. 1 acquires a three-dimensional (3D) tooth surface representation and acquires a spatially resolved angular distribution of color vectors, wherein the spatially resolved angular distribution of color vectors associates one or more point positions from the surface data to the corresponding angular distribution of color vectors. Processor 80 obtains the tooth surface representation and is programmed with processing logic instructions to identify one or more shade values, wherein each shade value is associated with one angular distribution of color vectors from the spatially resolved angular distribution of color vectors, by comparing the angular distribution of color vectors to a set of reference angular distributions of color vectors, wherein each reference angular distribution in the set is associated with a corresponding shade value. Display 84 then displays the three-dimensional tooth surface representation and displays an indication of the identified shade values.

Consistent with one example embodiment of the present invention, a computer program with stored instructions that control system functions for image acquisition and image data processing for image data is stored and accessed from an electronic memory. As can be appreciated by those skilled in the image processing arts, a computer program of an embodiment of the present invention can be utilized by a suitable, general-purpose computer system, such as a personal computer or workstation that acts as an image processor, when provided with a suitable software program so that the processor operates to acquire, process, transmit, store, and display data as described herein. Many other types of computer systems architectures can be used to execute the computer program of the present invention, including an arrangement of networked processors, for example.

The computer program for performing the method of the present invention may be stored in a computer readable storage medium. This medium may comprise, for example; magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other network or communication medium. Those skilled in the image data processing arts will further readily recognize that the equivalent of such a computer program product may also be constructed in hardware.

It is noted that the term "memory", equivalent to "computer-accessible memory" in the context of the present disclosure, can refer to any type of temporary or more enduring data storage workspace used for storing and operating upon image data and accessible to a computer system, including a database. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It is understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The invention has been described in detail and may have been described with particular reference to a suitable or presently preferred example embodiment, but it will be understood that variations and modifications can be affected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A shade matching method for a tooth comprising:
   (aa) obtaining a plurality of digitized tooth shade references, wherein each tooth shade reference corresponds to a common 3D tooth shape having a reference coordinate system, a label and color information on the common 3D tooth shape;
   (a) obtaining a 3D surface representation of a tooth and associated color information defined on the 3D surface representation;
   (b) selecting a region on the 3D surface representation of the tooth defined by coordinates of a tooth coordinate system;
   (c) determining a plurality of correspondences with regions of the common 3D tooth shape of all the plurality of digitized tooth shade references by mapping the coordinates for the region on the 3D surface representation to coordinates of the reference coordinate system, wherein the plurality of correspondences connects points from a same anatomical region between the selected region on the 3D surface representation of the tooth and the common 3D tooth shape;
   (d) computing a color difference for each tooth shade reference of the plurality of digitized tooth shade references, wherein each color difference is computed by a comparison of color information from a tooth shade reference with the associated color information from the selected region on the 3D surface representation of the tooth, wherein the comparison of color information uses the plurality of correspondences; and
   (e) recording the label corresponding to the tooth shade reference with a smallest difference.

2. The method of claim 1, wherein the obtaining a plurality of digitized tooth shade references is operated before or after (a) obtaining a 3D surface representation of a tooth and associated color information defined on the 3D surface representation.

3. The method of claim 1, wherein the obtaining a 3D surface representation of a tooth and associated color information defined on the 3D surface representation is performed using an intraoral scanner.

4. The method of claim 1, wherein the associated color information defined on the 3D surface representation includes red, green, and blue color data values.

5. The method of claim 1, wherein the associated color information defined on the 3D surface representation includes CIELAB color data values.

6. The method of claim 1, wherein the associated color information defined on the 3D surface representation includes a spectrum with wavelengths covering visible wavelengths.

7. The method of claim 1, wherein the selecting a region on the 3D surface representation of the tooth comprises a segmentation process, wherein the segmentation process is manual, semi-automatic or automatic.

8. The method of claim 1, wherein the determining a plurality of correspondences is a manual process, an automatic process or a semi-automatic process, wherein
the manual process comprises a step that a user determines and selects the same anatomical region on the common 3D tooth shape using a computer mouse or a touchscreen;
the automatic process comprises optional steps, including:
(a) segmenting the 3D surface representation of the tooth from gums using colors and morphological operations; and
(b) mapping from the selected region on the 3D surface representation of the tooth to the region on the common 3D tooth shape using an injective transformation, wherein the injective transformation is determined by the 3D surface representation of the tooth and a surface of the tooth shade reference; and
the semi-automatic process comprises a step that a user operates further adjustment of the region provided by the automatic process, wherein the further adjustment includes making further modification to position, scale or orientation of the region provided by the automatic process.

9. The method of claim 1, wherein each one of the plurality of digitized tooth shade references comprises a shade tab from a shade guide.

10. The method of claim 1, wherein the color information comprises spatially resolved angular distributions of color vectors of the tooth or the tooth shade reference.

11. The method of claim 1, wherein the color information comprises surface texture information of the tooth or the tooth shade reference.

12. The method of claim 2, wherein the color information comprises an angular distribution that comprises at least one of an incident illumination direction, a reflected light direction, a surface normal, and a position on a tooth surface.

13. The method of claim 2, wherein the color information comprises a reference angular distribution of color vectors and associated shade information that is acquired from measurements of a set of dental shade tabs.

14. The method of claim 2, wherein the color information comprises an angular distribution of color vectors that comprises bidirectional reflectance distribution function (BRDF) values.

15. The method of claim 2, wherein the color information comprises an angular distribution of color vectors that comprises spatially varying bidirectional reflectance distribution function (BRDF) values.

16. The method of claim 2, wherein the color information comprises an angular distribution of color vectors that comprises Bidirectional Surface Scattering Reflectance Distribution Function (BSSRDF) or Bidirectional Scattering Distribution Function values (BSDF).

17. The method of claim 1, wherein the 3D surface representation comprises a point cloud or a triangle mesh or a surface spline.

18. The method of claim 1, wherein the label is a text label or a color-coded label or a spatial profile of color variation over the 3D surface representation.

19. The method of claim 1, wherein the color information of the tooth corresponds to at least one of an upper, middle, or lower third of the tooth surface.

20. A shade matching method for a tooth, the method comprising:
a) selecting a tooth and defining a grid on a buccal surface of the tooth;
b) defining a mapping of the grid from the buccal surface to a 3D surface on a common 3D tooth shape, wherein the common 3D tooth shape is shared among a plurality of digitized tooth shade references each containing color information on a tooth shade reference;
c) computing a shade label for each cell of the grid based at least in part on a correspondence between each cell of the grid and a region of at least one of the plurality of digitized tooth shade references; and
d) storing shade labels for each of a plurality of cells of the grid.

21. An intraoral imaging apparatus, said apparatus comprising:
an image capture apparatus that obtains a plurality of digitized tooth shade references, wherein each tooth shade reference corresponds to a common 3D tooth shape having a reference coordinate system, a label and color information on the common 3 D tooth shape;
another image capture apparatus that obtains a 3D surface representation of a tooth and associated color information defined on the 3D surface representation;
a processor that is programmed with processing logic instructions to:
(a) select a region on the 3D surface representation of the tooth defined by coordinates of a tooth coordinate system;
(b) determine a plurality of correspondences with regions of the common 3D tooth shape of all the plurality of digitized tooth shade references by mapping the coordinates for the region on the 3D surface representation to coordinates of the reference coordinate system, wherein the plurality of correspondences connects points from a same anatomical region between the selected region on the 3D surface representation of the tooth and the common 3D tooth shape;
(c) compute a color difference for each tooth shade reference of the plurality of digitized tooth shade references, wherein each color difference is computed by a comparison of color information from a tooth shade reference with the associated color information from the selected region on the 3D surface representation of the tooth, wherein the comparison of color information uses the plurality of correspondences; and
(d) record the label corresponding to the tooth shade reference with a smallest difference.

22. An intraoral imaging apparatus, said apparatus comprising:
an image capture apparatus that obtains a plurality of digitized tooth shade references, wherein each tooth shade reference corresponds to a common 3D tooth shape having a reference coordinate system, a label and color information on the common 3D tooth shape, and the image capture apparatus that obtains a 3D surface representation of a tooth and associated color information defined on the 3D surface representation;
a processor that is programmed with processing logic instructions to:

(a) select a region on the 3D surface representation of the tooth defined by coordinates of a tooth coordinate system;
(b) determine a plurality of correspondences with regions of the common 3D tooth shape of all the plurality of digitized tooth shade references by mapping the coordinates for the region on the 3D surface representation to coordinates of the reference coordinate system, wherein the plurality of correspondences connects points from a same anatomical region between the selected region on the 3D surface representation of the tooth and the common 3D tooth shape;
(c) compute a color difference for each tooth shade reference of the plurality of digitized tooth shade references, wherein each color difference is computed by a comparison of color information from a tooth shade reference with the associated color information from the selected region on the 3D surface representation of the tooth, wherein the comparison of color information uses the plurality of correspondences; and
(d) record the label corresponding to the tooth shade reference with a smallest difference.

* * * * *

UNITED STATES PATENT AND TRADEMARK OFFICE
CERTIFICATE OF CORRECTION

PATENT NO. : 12,251,278 B2
APPLICATION NO. : 17/431747
DATED : March 18, 2025
INVENTOR(S) : Yannick Glinec et al.

Page 1 of 1

It is certified that error appears in the above-identified patent and that said Letters Patent is hereby corrected as shown below:

In the Claims

In Column 29, Line 61, Claim 16, delete "values (BSDF)." and insert -- (BSDF) values. --, therefor.

Signed and Sealed this
Second Day of September, 2025

Coke Morgan Stewart
*Acting Director of the United States Patent and Trademark Office*